United States Patent [19]

Tabayashi et al.

[11] Patent Number: 6,074,467

[45] Date of Patent: Jun. 13, 2000

[54] JET INK AND PROCESS FOR PREPARING DISPERSION OF COLORED FINE PARTICLES FOR JET INK

[75] Inventors: Isao Tabayashi, Kuki; Kazunari Kawai, Kitaadachi-gun; Sadahiro Inoue, Toda; Ritsuko Doi, Ageo; Norie Osawa, Kitaadachi-gun, all of Japan

[73] Assignee: Dainippon Ink and Chemicals, Inc., Tokyo, Japan

[21] Appl. No.: 09/068,340

[22] PCT Filed: Sep. 11, 1997

[86] PCT No.: PCT/JP97/03211

§ 371 Date: May 11, 1998

§ 102(e) Date: May 11, 1998

[87] PCT Pub. No.: WO98/11170

PCT Pub. Date: Mar. 19, 1998

[30] Foreign Application Priority Data

Sep. 13, 1996 [JP] Japan .................................. 8-243161
Apr. 21, 1997 [JP] Japan .................................. 9-103145

[51] Int. Cl.$^7$ .................................................. C09D 11/00
[52] U.S. Cl. .................................... 106/31.65; 106/31.72; 106/31.75
[58] Field of Search ............................. 106/31.65, 31.72, 106/31.75

[56] References Cited

U.S. PATENT DOCUMENTS 5,556,583  9/1996  Tashiro et al. ....................... 106/31.65
5,795,376  8/1998  Ide ...................................... 106/31.65

FOREIGN PATENT DOCUMENTS 2105250      1/1995   Canada .
0 635 380 A1 1/1995   European Pat. Off. .
50-122528    9/1975   Japan .
5-247370     9/1993   Japan .
8-183920     7/1996   Japan .

OTHER PUBLICATIONS

Patent Abstract of Australia No. AU–A–42027/93 dated Feb. 2, 1975. (See PCT Search Report).

Primary Examiner—Mark L. Bell
Assistant Examiner—Veronica F. Faison
Attorney, Agent, or Firm—Armstrong, Westerman, Hattori, McLeland, and Naughton

[57] ABSTRACT

An aqueous jet ink which is provided with a long-term dispersion stability, a stable emission property as a ink-jet stream, and good adhesion of printed images to the recording medium. The present jet ink is constituted as an aqueous liquid dispersion of fine color particles which are formed by coating fine pigment particles (a) with a coat forming resin having carboxyl groups (b). The surface of the color particles is covered with the quaternary carboxyl groups in a form of quaternary ammonium salt and the average volume diameter of the fine color particles is restricted to less than 0.5 μm. An increase rate of the average volume diameter of the fine color particles when the dried ink is dispersed again in water is also restricted to less than 50%.

6 Claims, 8 Drawing Sheets

JET INK AND PROCESS FOR PREPARING DISPERSION OF COLORED FINE PARTICLES FOR JET INK

FIELD OF THE INVENTION

The present invention relates to a method of manufacturing jet ink and particularly relates to dispersion systems of colored fine particles used for the jet ink.

BACKGROUND ART

There are two types of inks used for ink-jet printing: oily inks and aqueous inks. Since the oily inks have problems due to unpleasant odors and toxicity, aqueous inks are widely used currently.

However, conventional aqueous inks have drawbacks in water proofing and fade-resistance qualities, because it uses water soluble dyes as the coloring agent. Moreover, since the dye is dissolved to its molecular level, the quality of the printing is extremely deteriorated because beard-like bleeding called "feathering" occurs, when printing is performed using ordinary paper which is normally used in offices, for example, for copiers.

Conventionally, so called "aqueous pigment inks" are proposed. Examples of these inks include an ink and a polymer latex which contain carbon black or an organic pigment dispersed in a water-soluble resin used for both the purposes of a binder and of a dispersing medium, and a dispersion-type ink composed of microcapsules involving a colorant agent which is dispersed in a resin dispersion medium.

As an aqueous pigment ink for a ink-jet printer, it is necessary to use fine colorant particles dispersed as finely as possible in an aqueous medium. An example of the aqueous ink of a resin solution type is shown in Japanese Patent No. 2512861, which discloses a method of preparation of an aqueous ink with improved characteristics, comprising the steps of: (1) supplying a pigment and a polymer dispersion agent into a twin roll milling device, (2) obtaining a dispersion product of the pigment and the polymer dispersion agent by milling, and (3) dispersing the dispersion product in an aqueous carrier medium. Japanese Patent Application, First Publication, No. Hei 3-153775 discloses an aqueous ink composition for ink-jet printing comprising (a) a solid mixture of a pigment and a polyacrylate resin containing a carboxyl group, (b) an organic solvent which can be diluted by water, (c) a wetting agent, and (d) water. Although these techniques are effective in pulverizing the pigment into fine particles, the printing operation is often interrupted by an extraordinary emission of ink due to the increase of the viscosity of the ink caused by evaporation of water in the ink, and in the worst cases, the jet nozzle is clogged, and it is observed that the water proof quality of the printed matter is poor.

In general, the resin-dispersion-type aqueous ink is advantageous in the low susceptibility for the viscosity increase by water evaporation. Practically, Japanese Patent Application, First Publication, No. Sho 58-45272 discloses an ink composition including an urethane polymer latex containing dyes, and Japanese Patent Application, First Publication, No. Sho 62-95366 proposes an ink containing a dye packed in polymer particles which are produced by dissolving a polymer and a solvent dye in a water insoluble organic solvent, mixing with a water solution containing a surface active agent and emulsifying the mixture, and after evaporating the solvent, obtaining an ink containing a dye involved in polymer particles. Japanese Patent Application, First Publication, No. Sho 62-254833 proposes a method of making an aqueous dispersion of the colorant by decreasing the surface tension at an interface between the organic solvent and water to less than 10 dyne at the time of the encapsulation process. Japanese Patent Application, First Publication, No. Hei 1-170672 proposes a recording liquid containing the microencapsulated dye. However, the above colorant dispersions are not necessarily sufficient in the dispersion stability and are also not necessarily satisfactory in the emission property of the ink-jet because of high foaming properties due to the effect of the surface active agent used in the encapsulation process.

Japanese Patent Application, First Publication, No. Hei 3-240586 proposes an image forming material, wherein the surface of dispersed particles in the dispersion medium is covered with a resin which swells by the dispersing medium. However, since the phase transformation of sol-gel easily occurs in a temperature range near room temperature, and since the dispersed particles are not stable in the dispersion medium, the image forming material often causes extraordinary emissions.

Japanese Patent Application, First Publication, No. Hei 5-247370 discloses a coloring composition for image recording comprising a pigment and a resin, wherein the pigment is coated with a resin which is substantially insoluble to the dispersion medium and which covers the pigment in a form of a cured polymer film having polar groups. However, since the above composition lacks a self-dispersion ability and lacks an adhering ability on a recording paper, it is necessary to incorporate resins as a dispersing agent and as a fixing agent, which hinder improvement of drawbacks such as low stability in emission of the ink and low water proof quality of the printed image, even though the dispersion stability is better than the ink containing the pigment without the coating of the cured resin.

Furthermore, Japanese Patent Application, First Publication, No. Hei 2-255875 discloses an aqueous ink for an ink-jet printer comprising a pigment, a water soluble resin, water soluble organic solvent, and water, wherein "resin adsorbed pigment particles", in which the water soluble resin is fixed on the pigment particles by a weak binding force, are dispersed in the aqueous medium, and in the aqueous medium, a limited amount of the water soluble resin is dissolved to less than 2% by weight, without being adsorbed on the pigment particles.

However, since the above method fails to provide a sufficient binding force between the pigment particles and the resin, a higher dispersion stability can be anticipated by the use of such "resin adsorbed pigment particles".

In addition, in the case when such "resin adsorbed pigment particles" are used, it will not be expected for an ink to be provided with both good emission property and good adhering property to the recording sheet, even if the quantity of the aqueous resin dissolved in the ink without being adsorbed by the pigment is restricted to less than 2% by weight.

The objects of the present invention are to provide a color microencapsuled-type aqueous jet ink which contains fine particles and is superior in dispersion stability, ink emission stability, and in adherence of microcapsules on the recording medium.

DISCLOSURE OF THE INVENTION

In order to achieve the above objects, the inventors of the present invention have found through extensive research that dispersion stability can be obtained by coating the pigment particles with a resin film, not by absorbing, and by the use of the color particles coated with the resin film having a specified particle diameter (hereinafter, such particles are sometimes called "color microcapsules"). It has also found to be effective for the dispersion stability to prevent the particle diameter of the color particles from varying, before and after, when the liquid dispersion medium of the ink is first removed and dried and then dispersing the color particles again in the same liquid dispersion medium.

The present inventors have achieved the above objects by limiting the quantity of the dissolved free resin component which is not coating the color particles in the jet ink composition to a specified quantity range, such that the stable emission of the ink-jet and adhering of the coloring capsule particles on the recording medium are ensured.

More specifically, it is found in the present invention, that instead of using the "resin adsorbed pigment particles" adsorbing the water soluble resin on the pigment surface, the pigment particles are coated by a coat forming resin having a "self dispersion property in water" to produce "the color microcapsules"; thereby the resin coatings are bonded to the pigment particles more strongly than the absorption, so that high dispersion stability of the pigment component in an aqueous medium is attained.

Moreover, when the amount of the free aqueous resin which is not bonded to the pigment particles but dissolved in water is restricted to less than 2% by weight of the aqueous jet ink composition containing the dispersed "color microcapsules", the stable emission property of the jet ink and the improved adhering property of the pigment particles to the recording medium are ensured and the objects of the present invention were accomplished.

The present invention provides the following.

The jet ink comprising a dispersion of the fine color particles (d) which are formed by coating the pigment particles (a) coated by a coat forming resin having carboxyl group (b) in an aqueous dispersion medium:
wherein, (1) the fine color particles (d) have quaternary carboxyl groups on the surface and have an average volume diameter less than 0.5 µm, and (2) "the increase rate of the average volume diameter of the fine color particles when the dried ink, obtained by drying the original ink, is re-dispersed in the dispersion medium" is less than 50%.

The jet ink is characterized in that the amount of the dissolved coat forming resin in the aqueous medium is less than 2% by weight of the ink.

The jet ink is characterized in that the standard deviation of "a frequency distribution of the color particles diameters in the redispersion of the dried ink" is less than 0.15.

Further, the jet ink, characterized in that the acid number of the coat forming resin having a carboxyl group (b) is in a range of 50 to 80, and that all or a part of the carboxyl group is converted into the quaternary ammonium salts by organic amine compounds.

A method of manufacturing a dispersion of fine color particles for a jet ink comprises the steps of:

(1) homogeneously mixing (i) a colored compound (V) made by kneading the pigment and the coat forming resin having carboxyl groups (b), (ii) an aqueous medium comprising water and an organic solvent (e) which is soluble the coat forming resin (b), (iii) a basic compound;

(2) manufacturing a dispersion of the fine color particles (X) by dispersing in an aqueous medium fine color particles which are the coated fine pigment particles with the coat forming resin and which have quaternary carboxyl groups on the surface; and subsequently (3) removing the organic solvent from the dispersion (X).

The above method, characterized in further comprising the step of:
depositing the coat forming resin which is dissolved in the dispersion (X) of the fine color particles on the fine color particles by addition of a poor solvent for the coat forming resin in the dispersion (X) of the fine color particles; and subsequently removing the organic solvent (e) from the dispersion (X).

The phrase "the increase rate of the average volume diameter of the microcapsules when a dried ink is re-dispersed in the dispersion medium" is expressed by the following formula, $$[(S2/S1)-1] \times 100$$

wherein, S1 and S2 are defined as follows. 10 µl of the jet ink is put in a hole (14 to 16 mm in diameter and the maximum depth of 0.4 to 0.8 mm) formed on a slide glass or on a small petri-dish (a cylindrical dish with 14 to 16 mm in diameter and a height of 10 to 15 mm), drying the jet ink by holding in an atmosphere at 25° C. and at 20% relative humidity for 7 days, and the dried ink remaining in the hole is dispersed again in 10 ml of water which is referred to as the "redispersion fluid of the dried ink", and which is diluted by 1000 times. An average volume diameter of the color particles in the redispersion of the dried ink is measured and the measured value is set as S2.

Whereas the same ink as that used in the above procedure is directly diluted with 10 ml of pure water, that is, the ink is diluted by 1000 times, and the average volume diameter of the color particles in the diluted dispersion is measured, which is set as S1.

Although conventional apparatuses may be used for measuring the average volume diameter of the color particles, it is preferable to use an apparatus, Microtrac Ultrafine Particle Analyzer, produced by Leeds and Northrup Co.

The phrase "a frequency distribution of the color particles diameters in the redispersion fluid of the dried ink" is defined as the frequency distribution of the average diameters, preferably the average volume diameter, of the color particles in the "redispersion of the dried ink" which is already defined.

The fine color particles in this specification may be called "microcapsule particles", "color microcapsules", or "microcapsules".

The present specification uses the SI unit system, and weights are represented by mass.

BEST MODE FOR CARRYING OUT THE INVENTION

Figure 1:
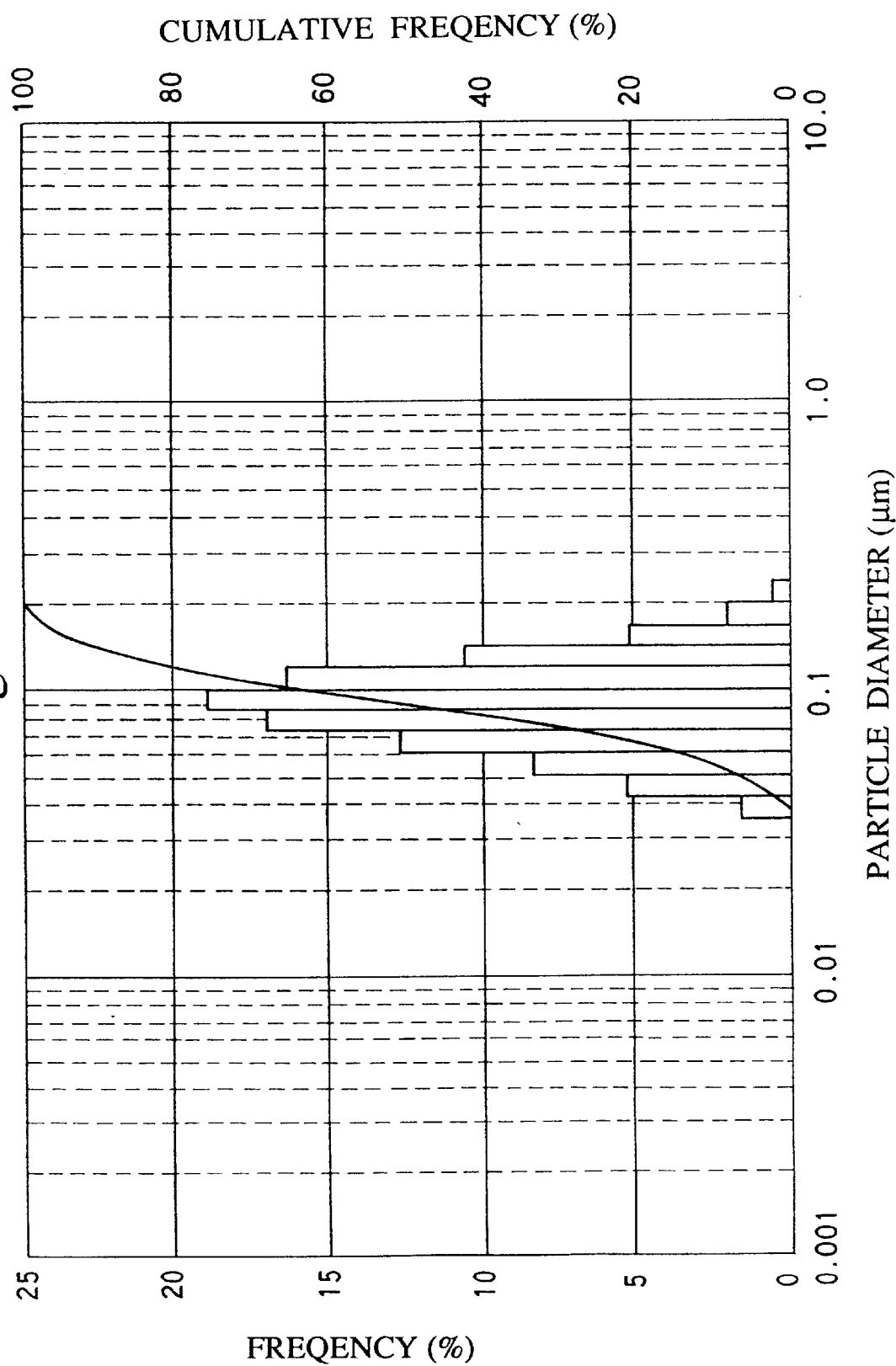
FIG. 1 shows a diagram of a frequency distribution of volume diameters of the fine color particles in the jet ink of Example 1 of the present invention.
Figure 2:
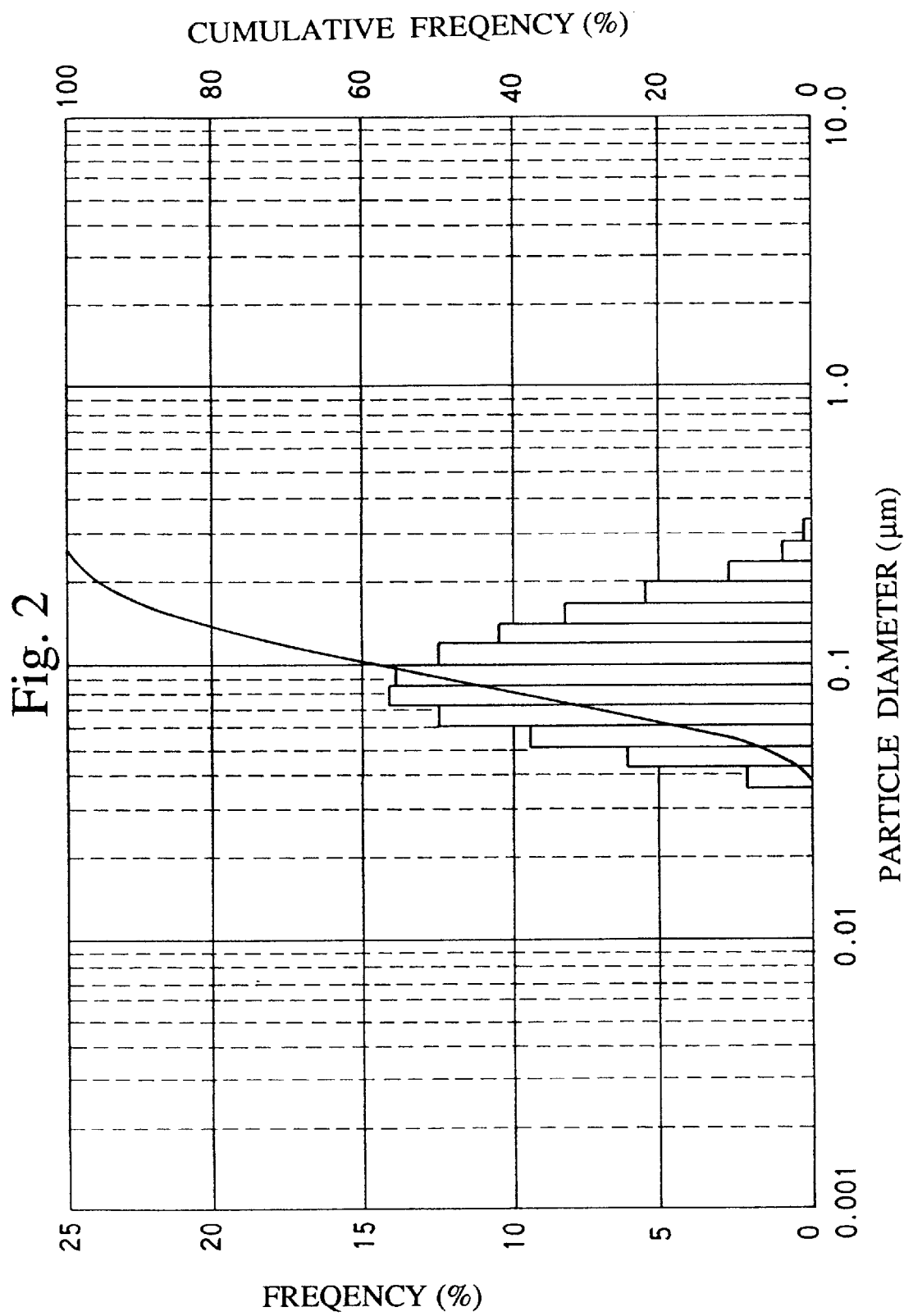
FIG. 2 shows a diagram of a frequency distribution of volume diameters of the fine color particles in the redispersion fluid of the dried jet ink of Example 1.
Figure 3:
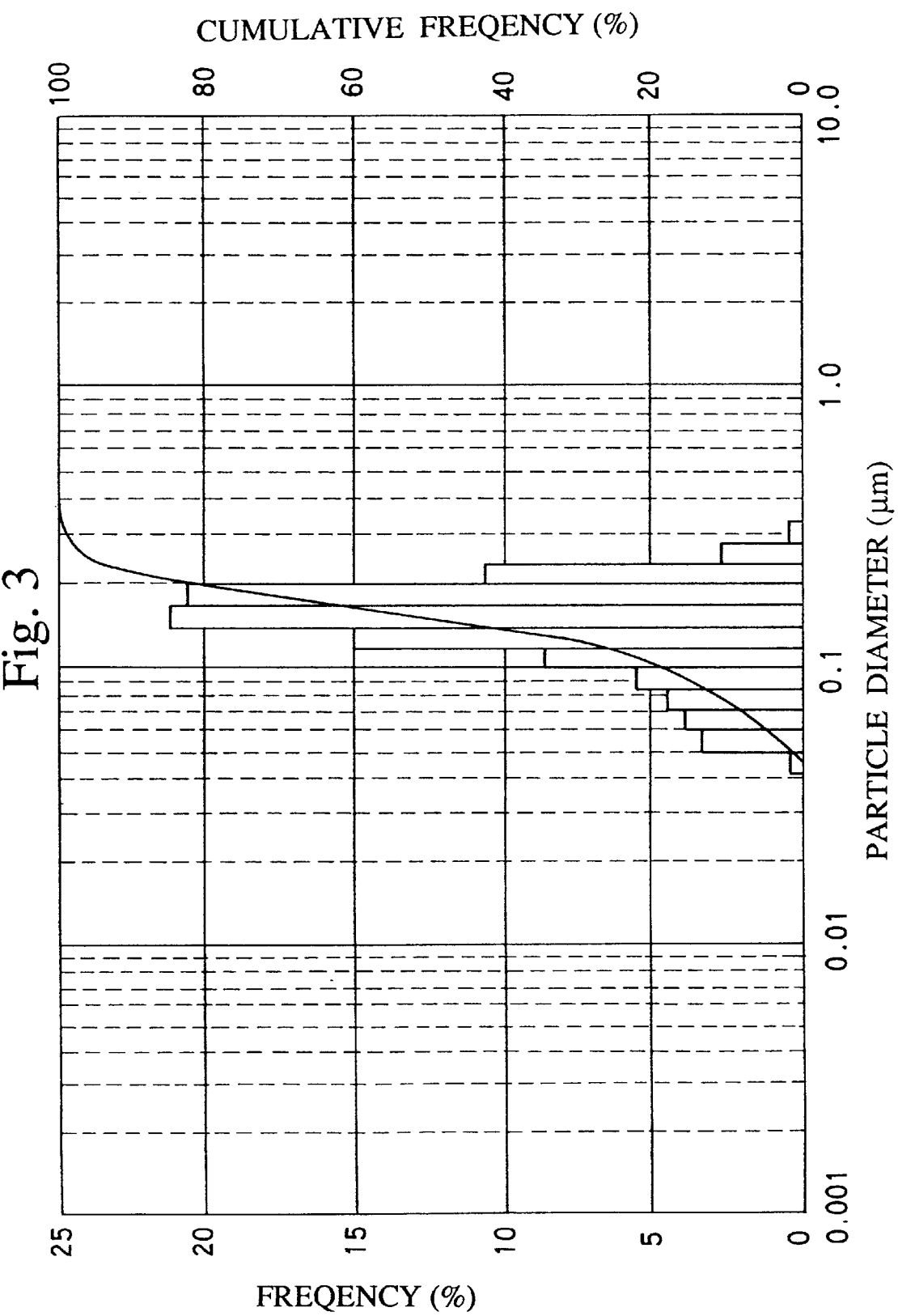
FIG. 3 shows a diagram of a frequency distribution of volume diameters of the fine color particles in the jet ink of Example 4 of the present invention.
Figure 4:
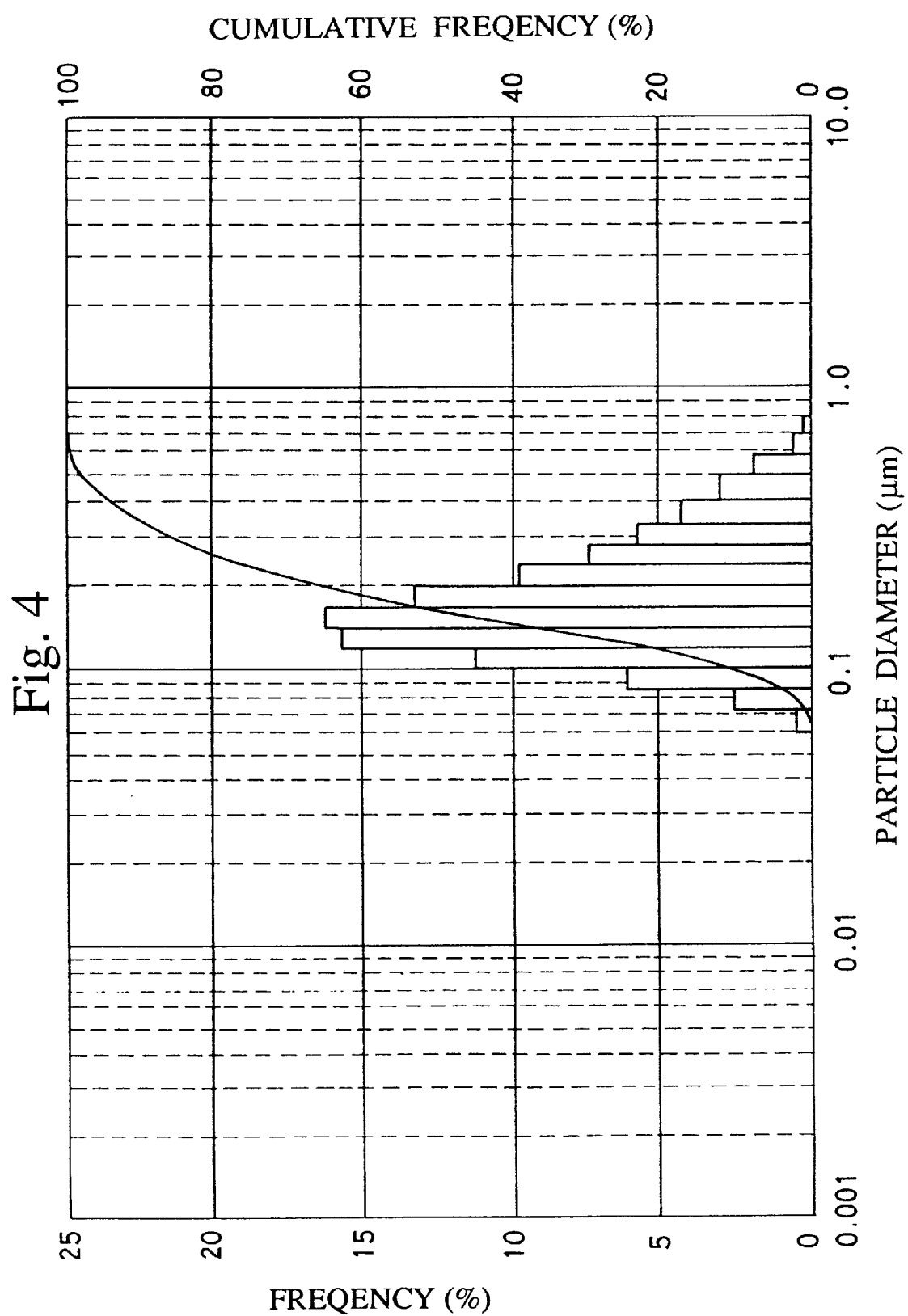
FIG. 4 shows a diagram of a frequency distribution of volume diameters of the fine color particles in the redispersion fluid of the dried jet ink of Example 4.
Figure 5:
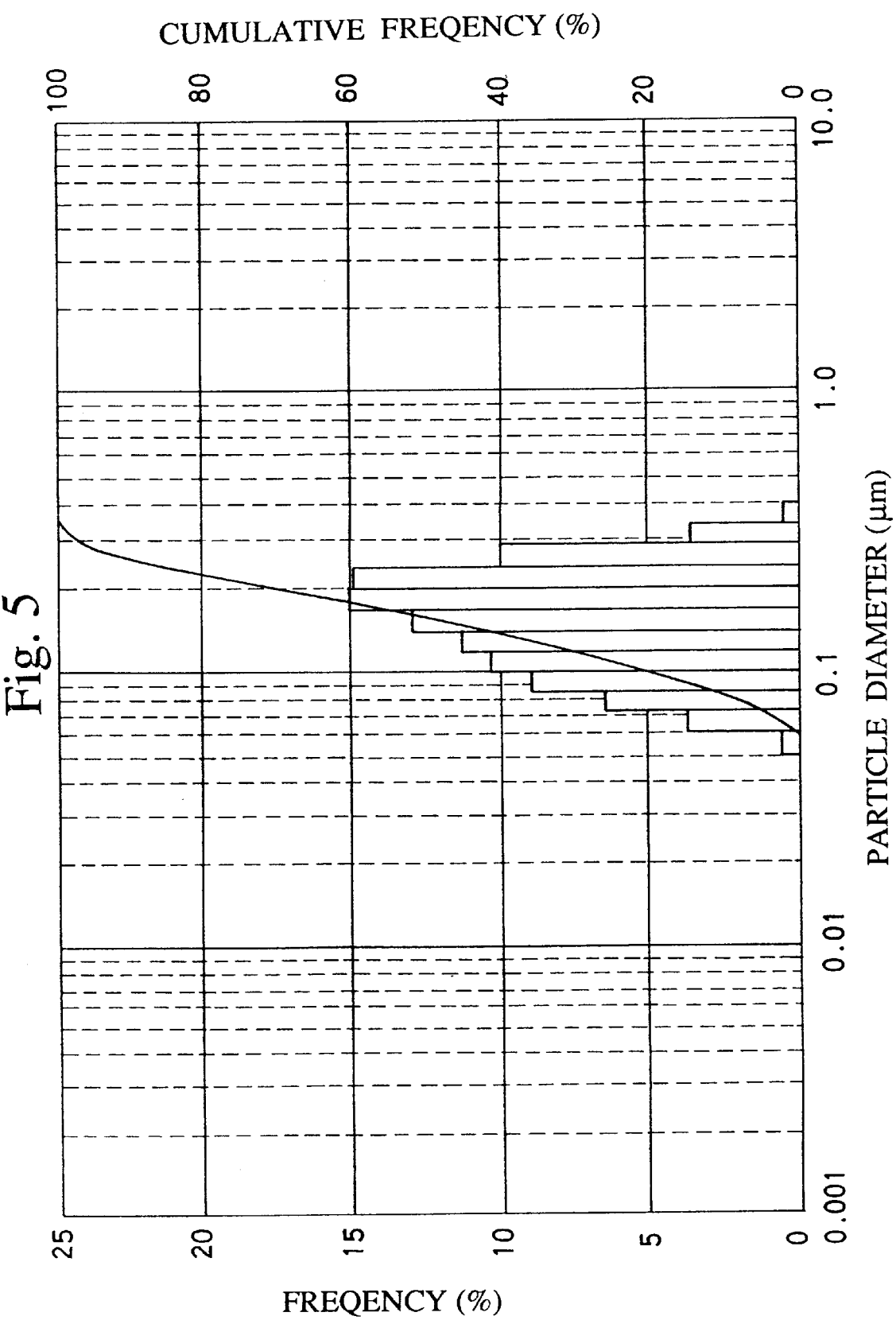
FIG. 5 shows a diagram of a frequency distribution of volume diameters of the fine color particles in the jet ink of Example 6 of the present invention.
Figure 6:
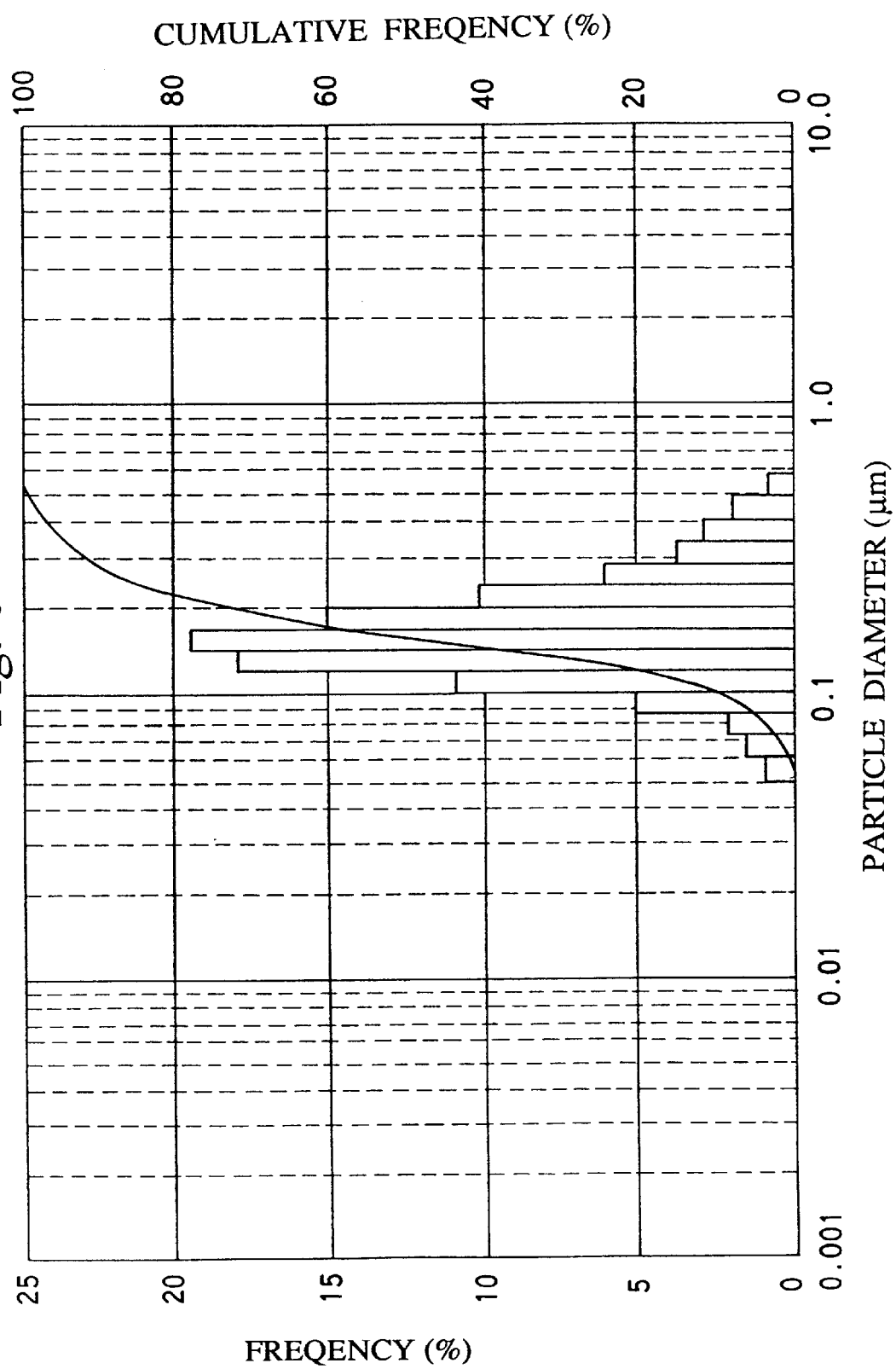
FIG. 6 shows a diagram of a frequency distribution of volume diameters of the fine color particles in the redispersion fluid of the dried jet ink of the Example 6.
Figure 7:
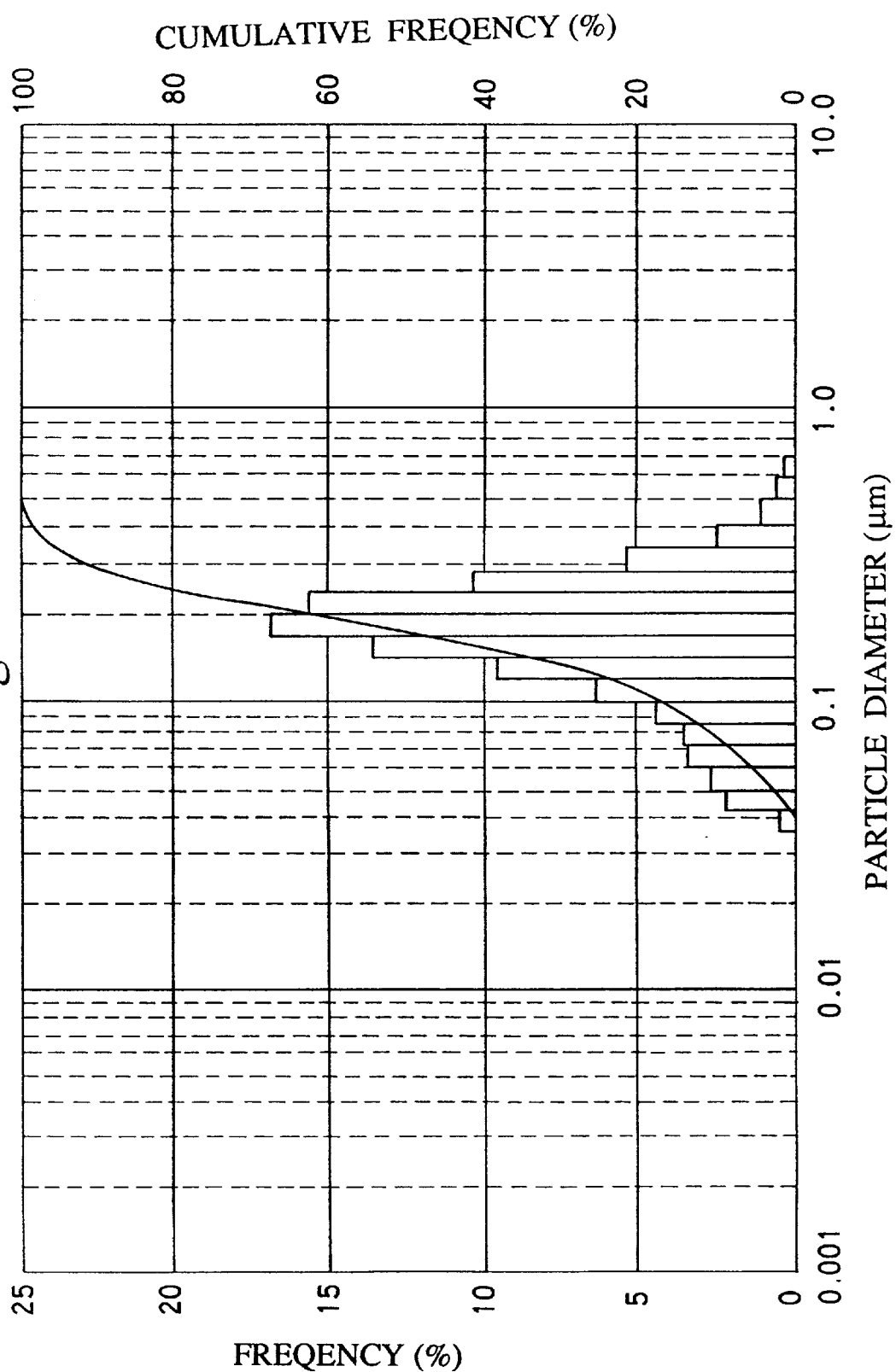
FIG. 7 shows a diagram of a frequency distribution of volume diameters of the fine color particles in the jet ink of Example 7 of the present invention.
Figure 8:
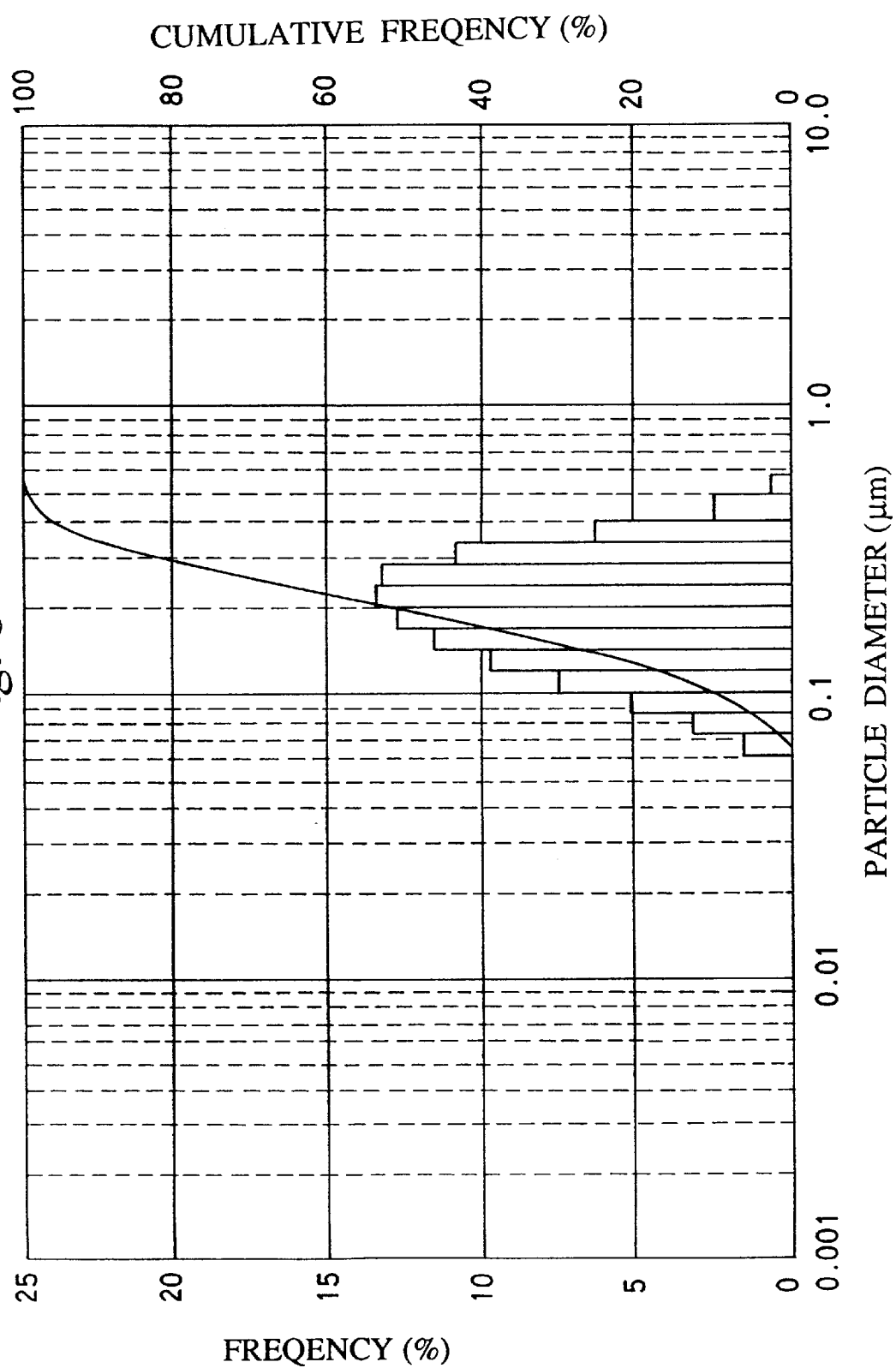
FIG. 8 shows a diagram of a frequency distribution of volume diameters of the color particles in the redispersion of the dried jet ink of Example 7.

It is necessary to overcome a problem of clogging of the ink-jet nozzle caused by drying of the ink at the nozzle end, in order to ensure a stable application of an ink using a pigment as a jet ink for an ink-jet printer. A conventional ink obtained by the technique, which uses a water soluble resin as a dispersion medium and stabilizes the dispersion of the fine pigment particles by adsorption, tends to cause cohesion of the fine pigment particles accompanied by evaporation of water. Once cohesion of the fine pigment particles is caused, it is almost impossible to redisperse these particle by the addition of water or the same ink, so that the cohered particles cause clogging of the ink-jet nozzle. When the redispersion is prepared after a liquid medium is evaporated, whether dried fine pigment particles or fine color particles are dispersed at the same level of the original ink will be a measure to judge the difficulty of clogging.

It is possible to evaluate the cohesion property of the color particles by measuring the rate of increase of the coloring particle diameters with time, and the particle diameters may be measured as an average particle diameter, a median diameter (50% of particle diameters), or an increase of the diameter of coarse particles (for example, 90% of particle diameters). The inventors of the present invention found that the average diameters, particularly the average volume diameters are closely correlated with the clogging of jet nozzle by the jet ink.

It is desirable to use "the fine color particles (a) which are the fine pigment particles coated by the coat forming resin having a carboxyl group (b)" with an average volume diameter of less than 0.5 $\mu$m, preferably in a range of 0.01 to 0.3 $\mu$m.

The jet ink of the present invention is defined such that "the increase rate of the volume diameter of the fine color particles (d) in the redispersion of the dried ink" is less than 50%. It is preferable to use the jet ink with the increase rate of less than 40%, and most preferable with the increase rate of less than 20% from the point of view of its performance.

It is preferable to select samples from the same vessel when the above two tests are carried out. In the present invention, a new vessel is opened and an ink sample is sampled immediately from the vessel and the average volume diameter of the color particles are measured to yield the value of S1.

It is preferable that both values of S1 and S2 be less than 0.3 $\mu$m.

It is preferable that the standard deviation (sd) of "the frequency distribution of the average volume diameter of the fine color particles in the redispersion of the dried ink" is less than 0.15, more preferably less than 0.1.

It is desirable that the standard deviation in the frequency distribution of S1 be identical with the above S2.

In general, the ink, which is not limited to that of the present invention, possibly comprises, for example, "color microcapsules made by coating the pigment with a coat forming resin which are not soluble in the dispersion medium", "free pigment particles which are not soluble in the dispersion medium and are not coated by the coat forming resin", "free resin particles of a coat forming resin which are not coating the pigment and which are not soluble in the dispersion medium", "a coat forming resin dissolved in the dispersion medium", a dispersion medium, and, additives added according to necessity, such as a desiccant or a penetrant.

In order to solve the above problems, the jet ink of the present invention comprising a dispersion of fine color particles (d), which are the coated pigment particles (a) with a coat forming resin having a carboxyl group (b), in a water-based medium: wherein the jet ink is limited to (1) said fine color particles (d) having quaternary carboxyl groups on the surface and having average volume diameter of less than 0.5 $\mu$m; (2) "the rate of increase of the average volume diameter of the color particles in the re-dispersed fluid of the dried ink" being less than 50%.

In order to put these conditions into effect, it is effective to eliminate or to restrict the amount of the free coat forming resin dissolved in the water-based medium within a permissible range.

Preferably, the amount of the dissolved coat forming resin should be minimized and limited to less than 2% by weight of the ink.

However, it is comparatively difficult to suppress the amount of the free coat forming resin dissolving in the ink in total coat forming resin within a range of less than 0.01% by mass of the ink; and if the amount of free coat forming resin in the ink is less than 0.01% by mass, it is anticipated that the resultant ink, when the printing is performed by such ink on a recording sheet, may be inferior in adhesion of microcapsules to the surface of the recording sheet so that printed matter formed by such ink may fail to exhibit good durability to rubbing.

On the contrary, if an amount of the free coat forming resin dissolving in the ink exceeds 2% by mass, when such ink is used for printing, adhesion of the microcapsules to the printing sheet and the mutual cohesion of microcapsules may be improved, whereas, when printed on the recording sheet, the ink may suffer from a drawback in that it takes a long time for the coat forming rein to solidify on the printed sheet, and also from a drawback in stable emission of the jet ink, because the coat forming resin is more likely to cause the clogging of the jet nozzle accompanied by evaporation of water, compared to the case when a water soluble resin such as a polymer dispersion agent or the like is used.

By controlling the amount of the coat forming resin within a range of 0.01 to 2% by mass, and more preferably within a range of 0.1 to 1% by mass, the adhesion of microcapsules in the ink to the recording sheet, the mutual cohesion of microcapsules, and high durability against rubbing of the printed matter are improved, as well as yielding drastic improvement of a stability of the jet ink emission, because clogging of the jet nozzle accompanied by evaporation of water is reduced.

Here, the content of the coat forming resin dissolving in the ink is represented by the absolute amount, which will be referred to as an absolute content.

The term "aqueous or water-based medium" in this invention represents a medium comprising merely water or water as a main component and a solvent or other additives added according to necessity. In this invention, it is preferable to select a chemical composition or a mass ratio of an aqueous medium as the dispersion medium so as to almost not to dissolve the coat forming resin.

If the resin forms a film, any resin may be used as the coat forming resin, not being limited to natural or synthetic resins, for example, styrene resins, acrylic resins, polyester resins, and polyurethane resins. Said resin may be a type of resin with a reversible bridging property, which is bridging at room temperature, but converts to non-bridging by heat.

Resins such as ionomers exhibit such reversible bridging property.

However, it is preferable to use the coat forming resin which is linearly bonded and which is substantially thermally plastic, and it is not preferable to use a resin which is permanently bridging without showing any thermal dependency.

However, it is necessary for the coat forming resin to be highly hydrophilic in order to prepare a stable dispersion of the coloring microcapsules, which results in a large amount of the coat forming resin being dissolved in the ink. In this case, the coat forming resin dissolving in the ink may cause the mutual cohesion of coloring microcapsules during storage due to the formation of bridging between respective coat forming resins coating the microcapsules produced through entanglement of the dissolved coat forming resins. In addition, in the printing operation, the coat forming resin dissolved in the ink is likely to cause irregularities in jet emission of the ink by an increase of the ink viscosity accompanied by evaporation of water at the position of the jet nozzle and by adhesion of the condensed ink at a peripheral area of the nozzle.

Examples of irregularities in jet emission involve an unusual discharge of ink or a clogging of the nozzle.

In contrast, when the hydrophilic property of the coat forming resin is low, the dispersion of the color microcapsules will not be sufficiently stable. Thus, it is preferable to minimize the solution of the coat forming resin into the aqueous medium to accomplish the stable dispersion in said aqueous medium.

It may be possible to add a surface active agent or a dispersing agent with a coat forming resin which is originally not hydrophilic or is poorly hydrophilic in order to obtain a stable dispersion. However, it is desirable to adjust the ink without using a surface active agent or a dispersion agent from the points of view of obtaining the stable discharging of the ink-jet and a good water proof quality of the printed matter.

As one of the methods to adjust the ink without using the surface active agent or the dispersion agent, it is advantageous to use a neutralized resin, which is originally able to be dispersed in an aqueous medium and is neutralized with a neutralizing agent.

As the neutralized coat forming resin which is originally able to be dispersed in the aqueous medium and is obtained by neutralization by a neutralization agent, it is typically prepared by neutralizing a resin which is able to be dispersed in an aqueous medium by a base. In this invention, the resin in itself which can be dispersed without adding a surface active agent or a dispersing agent is called a "self water-dispersing resin". It is preferable to use such self water-dispersing resin obtained by neutralization with a base as the coat forming resin.

A typical example of the coat forming resin having an acid group is the coat forming resin having carboxyl groups (b). The fine color particles (d) which is prepared by coating the fine pigment particles (a) with the coat forming resin having a carboxyl group (b) can be made to be dispersed in the aqueous medium by converting the carboxyl groups at the surface of coating resin in contact with the aqueous medium into quaternary salts. The coat forming resin having the carboxyl groups may be either a water soluble resin or a self water dispersing resin, depending upon a ratio of quaternary groups in the total amount of carboxyl groups which is defined as an acid value. The effects of this invention are characteristic in the case when the coat forming resin (b) on the fine pigment particles (d) is substantially insoluble to the aqueous medium, that is, the coat forming resin is in a state of the self water dispersing resin.

The acid value of a preferable resin is within 10 to 280.

More preferably, the resin with the acid values from 50 to 180 is used.

Here, the acid value is indicated by a number of milligrams (mg) of potassium-hydroxide (KOH) which is consumed to neutralize one gram (1 g) of resin, and is represented as mg·KOH/g (The unit of the acid value will be omitted hereinafter). The preferable resin is obtained by neutralizing all or a part of the acid value of a resin having said specific acid value.

It is preferable to make the pH of the ink to be within 7.5 to 9.0.

It is not appropriate to use a resin with an acid value of less than 50, because the surface of microcapsules are not sufficiently hydrophilic and microcapsules will not produce a stable dispersion. It is also not appropriate to use a resin having an acid value exceeding 180, since the resin is too hydrophilic to sufficiently encapsulate the microcapsule particles due to swelling, which results in causing mutual cohesion of microcapsules and clogging of nozzle.

It is not appropriate to use an ink of pH of less than 7.5, because the dispersion stability of the ink is degraded, and it is also not appropriate to use an ink of pH of more than 9.0, because the coating becomes insufficient and the mutual cohesion of microcapsules and the clogging of the nozzle may be caused due to swelling.

It is most preferable for obtaining the optimum result of the present ink to introduce the coat forming resin with the acid value of 50 to 180, after neutralizing by a base to form a self water dispersing resin, and to adjust the pH of the ink into a range of 7.5 to 9.0.

Although there is no particular limitation for the molecular weight of the coat forming resin of the present invention, it is preferable to select the resin having a weight average molecular weight in a range from more than 1,000 to 100,000.

If the weight average molecular weight of the coat forming resin is less than 10,000, the resin will suffer by the insufficient formation of the coating, and the clogging of the jet nozzle may occur due to the mutual cohesion of the microcapsules.

In addition, when the molecular weight of the resin is less than 10,000, a print will suffer from poor water proof quality.

In the case of using styrene resins or acrylic resins, it is preferable to use resin having the molecular weight within a range of 1,000 to 100,000.

In order to yield better water proof quality, it is preferable to select a resin with a weight average molecular weight within a range of 10,000 to 100,000, and more preferably within a range of 30,000 to 100,000.

The preferable coat forming resin in the present invention is styrene type resins and (meth)acrylic type resins.

It is preferable for a resin having an acid value to use copolymers of (meth)acrylate and a monomer selected from the group consisting of, for example, styrene, substituted styrene, and (meth)acrylate-ester.

As the coat forming resin comprising a self water dispersing resin obtained by neutralizing the resin having an acid value by a base, it is preferable to use a self water dispersing resin obtained by neutralizing at least a part of the acid values by a base of copolymers of (meth)acrylate and a monomer selected from the group consisting of, for example, styrene, substituted styrene, and (meth)acrylate-ester.

Here, the (meth)acrylate is a general term including acrylic acid and methacrylic acid. It is essential for the present invention to include either acrylic acid or methacrylic acid, but it is more preferable to use a coat forming resin constituted by chemical structures originated from both acrylic acid and methacrylic acid.

In the present invention, in order to reduce solvency of the self water-dispersing resin as the coat forming resin, a preferable resin will be obtained by reducing the ratio of acrylic acid and by increasing the ratio of methacrylic acid among monomers having carboxyl groups.

That is, the most preferable self water-dispersing resin as the coat forming resin is the self water-dispersing resin obtained by neutralizing at least apart, by a base, of a copolymer obtained by copolymerizing a monomer, as a main constituent, selected from the group consisting of styrene, substituted styrene, and (meth)acrylate ester with acrylic acid and methacrylic acid, wherein the copolymer is constituted by a greater amount of methacrylic acid than the amount of acrylic acid.

The control of the pH of the ink to be basic is achieved by the addition of a neutralizing agent, that is, a base.

A base is used in the suspension process of a method of manufacturing a more preferable aqueous jet ink, and the method will be described hereinafter.

Examples of the base (sometimes called "the basic compound" in this invention) are metal hydroxides such as sodium hydroxide, potassium hydroxide, lithium hydroxide, and the like; basic materials such as ammonia, triethylamine, morpholine, and the like; alcohol-amines such as triethanol, amine, diethanol-amine, and N-methyldiethanol-amine.

It is preferable to adopt a volatile base which is volatile at a temperature at which the coat forming resin does not decompose.

It is necessary to adjust the strength of the base or the amount of the base used for neutralization, since the use of the stronger base for neutralizing the resin with higher acid values may increase the solution of the coat forming resin into the ink.

In the case of the resin having a high acid value, since the solubility of the resin increases with increasing degree of neutralization, adjustment is performed as to the amount of the base used for neutralization, depending on the degree of dissolution of the resin in the liquid medium and the intended particle size in the water dispersion fluid.

The solubility of the resin into water increases with increase of the degree of neutralization, whereas deposition of the resin on the color particles becomes insufficient in the reprecipitation process, and it is necessary to adjust the strength of the base or the amount of the base (degree of neutralization) used for neutralization.

In the case of the aqueous ink for ink jet printing, it is preferable to minimize the amount of the water soluble resin so as avoid undesirable influences on the stable jet emission, on the stable maintenance of the dispersion during storage, and on the water proof quality of the printed matter. The most suitable base for the aqueous ink for ink-jet printing is alcohol-amines, such as triethanol, because these alcohol-amines are weak bases and generation of the above water soluble resin component is limited.

In the ink-jet printing, the weak bases of alcohol-amines such as triethanol amine are the most appropriate, because the weak base will never cause deleterious effects such as clogging of jet-nozzles, stability of dispersion during storage, and the water proof quality of the printed matter.

The degree of neutralization of the resin by a base in the suspension process in a more preferable method for making the aqueous jet ink is controlled within a degree of self emulsification of the resin such as, for example, more than 10% by mol of the acid groups of the resin.

The degree of neutralization by a base in the present invention is defined as less than 100 mol % equivalent, or more preferably, less than 60 mol % equivalent. In particular, it is most preferable to use an alcohol-amine as the base and to control the degree of neutralization for the equivalent acid groups of the coat forming resin to less than 60% by mol.

It is preferable in the present invention to use a self water dispersing resin formed by neutralizing the coat forming resin with the acid value of 50 to 180 mg KOH/g to a degree of neutralization of less than 60% by mol equivalent to the acid groups of the coat forming resin.

It is preferable to obtain the fine color particles (d) by coating with a coat forming resin (b) having an acid value of 50 to 180 and having carboxyl groups, wherein all or a part of the carboxyl groups are converted into quaternary ammonium salts by a organic amine compound.

Any conventional or known coloring agents may be used without any limitation in preferable methods of the present invention for making a jet ink.

A pigment is more preferable than a dye in obtaining the coated color particles with a better water proof quality and fade resistance.

Any conventional or known pigments may be used for color microcapsules dispersed in the aqueous jet ink for jet ink printing without any limitation. The pigment is present in the color microcapsules (d) of the present invention as the fine pigment particles (a).

Examples of the pigments are, for example, inorganic pigments such as carbon black, titanium black, titanium white, zinc-sulfide, and red iron oxide; and organic pigments such as phthalocyanine pigment, azo pigments in monoazo-type and disazo-type, phthalocyanine pigment, and quinacridone pigment.

As described hereinafter in detail, a preferable pigment used for the ink is selected from the group of pigments comprising carbon black, phthalocyanine pigment, phthalocyanine halide pigment, quinacridone pigment, benzimidazolone-pigment, perinone pigment, and isoindolinone pigment.

In order to obtain achromatic coloring resin particles, especially for obtaining black color resin particles, carbon-black or the mixture of carbon-black with other minor colorant is used, and for obtaining chromatic color resin particles, organic pigments are preferable.

In order to yield color images, it is preferable to use chromatic pigments).

In order to form color images, especially for forming full color images, it is required at minimum to use a combination of three-colors composed of cyan-color (blue), magenta-color (red), and yellow-color. Furthermore, it is preferable for full color images to use a four-color combination by adding black to the three-color combination, and it is also preferable for color image formation by adding complementary colors to said three-color combination or the four-color combination.

It is preferable to select the phthalocyanine pigment as the cyan color from the points of view of the color tone and the water proof quality. Practically, preferable phthalocyanine pigments comprises non-metal phthalocyanine, copper-phthalocyanine, chlorinated-copper-phthalocyanine and other metal-phthalocyanines. Among these pigments, copper-phthalocyanine is more preferable and C. I. Pigment Blue 15:4 is most preferable in view of color tones and the dispersion property when it is combined with other color pigments.

It is preferable to select the quinacridone-pigment as the magenta-color from the color tone and the water proof quality. Practically, dimethylquinacridone and dichloroquinacridone are used as the quinacridone pigment. Among these quinacridone pigments, the most preferable pigment is C. I. Pigment Red 122 from the points of view of the color tone and the dispersion property.

It is preferable to select benzimidazolone pigments as the yellow color pigment in view of the color tone and the water proof quality. Practically, benzimidazolone pigments includes C. I. Pigment Yellow 120, C. I. Pigment Yellow 151, C. I. Pigment Yellow 154, C. I. Pigment Yellow 156, and C. I. Pigment Yellow 175. The most preferable pigment is C. I. Pigment Yellow 151 from the points of view of the color tone, the dispersion property, and the fading resistibility.

The preferable black pigment is, although not limited to, carbon black in view of the color tone and the water proof quality.

A color image formed by combinating an ink containing carbon black with at least three inks comprising a phthalocyanine pigment, a quinacridone pigment, and a benzimidazolone pigments, respectively, exhibits extremely stable image colors without incurring a color change by fading.

Particularly, the preferable color image with the image stability is obtained when an ink containing C. I. Pigment Blue 15:4 as the phthalocyanine pigment, an ink containing C. I. Pigment Red as the quinacridone pigment, and an ink containing C. I. Pigment Yellow 151 as the benzimidazolone pigment are used. The most preferable color images with a stability of color quality are obtained by addition of carbon black to the above combination according to necessity.

Each pigment may be used alone or in combination with other pigments, and the color image may be obtained by the ink containing a combination of pigments.

In the present invention, in addition to the above combination of four aqueous color inks containing respective preferable pigments, it is preferable to form color images on the recording medium using aqueous inks with intermediate colors in between respective four colors. Examples of the above intermediate colors are a phthalocyanine halide pigment, an imidazolone pigment, a perinone pigment, a isoindolinone pigments, and preferable intermediate color inks are as follows, although there are some inks which are not the dispersion type inks for color microcapsules.

(A) A green aqueous dispersion ink containing in an aqueous medium of the microcapsules which are prepared by coating fine particles of the phthalocyanine halide pigment with a coat forming resin;

(B) An orange aqueous dispersion ink containing in an aqueous medium the microcapsules which are prepared by coating fine particles selected from the group consisting of an imidazolone pigment, a perinone pigment, and an isoindolinone pigment.

In an aqueous medium of these (A) and (B) type inks, it is preferable to restrict the amount of the free coat forming resin dissolved in the dispersion medium within a range of 0.01 to 2% by mass for combining with each of the above aqueous inks.

Although there is no particular standard as to the content of pigment particles in the ink, if the ink achieve the object of the present invention, it is preferable to adjust the pigment content within a range of 0.5 to 20% by mass.

It is preferable to coat at least a part or the whole surface area of the coloring fine particles by the coat forming resin, the preferable ratio of the coat forming resin is within a range of 0.5 to 2% parts by mass to one part by mass of the pigment, although the ratio depends upon the specific surface area of the pigment particles and the thickness of the coated resin.

In the present invention, since almost all of the pigment particles are coated with the coat forming resin and no free pigment particles are present in the ink, almost all of the pigment used in the ink can be approximated as the content of color microcapsules in an ink.

More preferable results are obtained when the same mass amounts of a pigment and a coat forming resin having an acid value is used in a method of making an aqueous ink for the ink-jet recording which will be described hereinafter. The same mass amount means that amounts of both the pigment and the coat forming resin are identical in mass, or that the amount of the pigment is within ±15% by mass of the coat forming resin.

If necessary, it is possible to add to the ink an organic solvent which does not dissolve or which is difficult to dissolve the coat forming resin. Such organic solvents used in the ink include, for example, a desiccant or a penetrant.

The desiccant is used for preventing drying of the ink at the jet nozzle.

In general, the desiccant is an agent having a higher boiling point than that of water. Any conventional or known desiccant may be used, which includes polyols such as ethyleneglycol, propyleneglycol, diethyleneglycol, dipropyleneglycol, polyethyleneglycol, polypropyleneglycol, and glycerin.

In the case of glycerin, the most efficient effect is obtained for preventing drying of the ink.

In particular, glycerin enhances the dispersion stability of microcapsules, because glycerin strongly bonds to the coat forming resin by strong hydrogen bonds, and at the same time, glycerin bonds to the free coat forming resin, if present, by strong hydrogen bonds, so that drying of the ink at the jet nozzle can be prevented.

The penetrant is used for adjusting penetration of the ink in the recording medium and for controlling dot diameters on a recording medium. Examples of the penetrant include sub-alcohols such as ethanol, isopropylalcohol; addition products of ethylene oxide to alkylalcohols such as ethyleneglycolhexylether, diethyleneglycolbutylether; addition products of propylene oxide to alkylalcohols such as propyleneglycolpropylether.

Since an organic solvent having a superior penetrating property often destroys the microcapsules and injures the stability of the ink. It is possible to maintain stability of microcapsules by addition of a proper amount of at least a compound, selected from the group consisting of (k) an addition product of 1 mol of propylene oxide to a monoalcohol, (l) an addition polymer of 10 to 40 mol of propylene oxide to a monoalcohol of 11 to 6 carbon atoms, and (m) an addition product of 1 mol of ethylene oxide to a monoalcohol of 4 to 8 carbon atoms. It is more preferable to use a mixture of two compounds selected from the above three groups.

In general, an emulsification dispersion antifoaming agent containing silicone is added to the ink, for suppressing bleeding on the recording medium, for suppressing foaming, and for ensuring the stable emission of the ink. In the present invention, the use of the above three groups of compounds are more effective, instead of the emulsification dispersion antifoam containing silicone.

An example of (k) the single addition product of 1 mol of propylene oxide to a monoalcohol is a single addition product of propylene oxide (1 mol) to propanol.

An example of (l) a single addition polymer of 10 to 40 mol of propylene oxide to a monoalcohol of 11 to 6 carbon atoms is a single addition polymer of propylene oxide (17.7 mol) to butanol.

Examples of (m) a single addition product of ethylene oxide (1 mol) to a monoalcohol are a single addition product of ethylene oxide (1 mol) to butanol and a single addition product of ethylene oxide (1 mol) to hexanol.

It is preferable to add these products (k), (l), and (m) to the ink so as to minimize the foamability of the ink and not to cause phase separation on the ink surface, so that, although there is no limitation, the amount of addition is preferably within a range of 0.01 to 10% by mass.

It is preferable to add an organic solvent within a range of 1 to 80% by mass, when the solvent is used as the desiccant, and within a range of 0.01 to 10% by mass, when the solvent is used as the penetrant.

Since the organic solvent in the ink sometimes, depending upon the type of the resin or the concentration of the organic solvent, dissolves the coatings of the pigment particles leading to production of more than 2% by mass of the free dissolved resin in the ink and to disturbance of the stable jet emission, it is necessary to adjust the concentration of the organic solvent so as not to dissolve to exceed the free resin content 2% by mass, more preferably 1% by mass of the ink, taking the solvent type and pH of the ink into consideration.

It is preferable for a dispersing medium of the final ink to use one substantially composed of water, without substantially containing an organic solvent which dissolves the coat forming resin. If it is necessary to use, in an ink, an organic solvent (e) which dissolves the coat forming resin, it is preferable to reduce the concentration of the organic solvent so as not to dissolve the resin (b) containing the quaternary salts formed on the surface of fine color particles (d).

The present invention enables providing an aqueous ink with high printing quality, water proof, and fade resistant qualities as well as an aqueous ink with superior dispersion stability and ensuring the stable jet emission without generating clogging of the ink-jet nozzle.

When the content of a solid component is low in an ink except the coat forming resin, the amount of the free resin of the coat forming resin dissolved in the ink may be measured by a method, in which, first precipitating the microcapsules by a ultra-centrifuge, drying the supernatant sufficiently, and measuring the amount of the free resin as the non-volatile component. On the other hand, if a large amount of the solid component and the organic solvent with high boiling points is present in an ink, measurement is carried out by a method with the steps of, sufficiently drying the precipitated material, measuring the ratio of the resin and the pigment by the thermal analysis based on the difference of decomposition temperatures of resins and the pigment, determining the amount of the free resin by reducing from the original ratio between the coat forming resin and the pigment particle. The latter method is capable of measuring more accurately when the solid dispersant consists only of the color microcapsules, without containing free color particles without resin coatings nor "a particle composed only of the resin coating without a pigment particle". When a anti-drying agent or a penetrant are contained in a ink, it is possible to carry out more accurate measurement by removing these additives by drying at a temperature at which the coat forming resin does not decompose.

Hereinafter, a preferable coating method will be described for coating pigment particles with a coat forming resin having an acid value in the manufacturing of an aqueous jet ink dispersion of color microcapsules. According to the present method of coating, a preferable ink can be obtained which is only composed of color microcapsules, neither containing "free pigment particles without coated by the resin" nor only a extremely low amount of "a particle composed only of resin coating without a pigment particle".

A method shown hereinafter facilitates manufacture of a preferable ink which is only composed of color microcapsules, neither containing "free pigment particles without coated by the resin" nor only a extremely low amount of "a particle composed only of resin coating without a pigment particle", and this method is more preferable than a phase-transfer method which removes the organic solvent by phase-transfer emulsification from a dispersion of fine color particles in an organic solvent after addition of an aqueous medium. The method comprises the following processes.

[1] a resin coloring process for obtaining a solid color compound by dispersing a color agent in a coat forming resin having an acid value;

[2] a suspension process for obtaining a suspension containing the color agent and the coat forming resin in a dissolved state by first mixing at least water, an organic solvent to dissolve the coat forming resin, a base, and the compound obtained by the above process, and by dispersion; and

[3] a reprecipitation process for precipitating the resin component dissolved in the suspension obtained by the suspension process on the color agent surface.

This method can be practically carried out by the following steps from <1> to <5>.

<1> obtaining a solid color compound by dipersing a coloring agent in the coat forming resin having an acid value (kneading process).

This step is carried out by homogeneously dispersing a color agent in the coating resin which is in a state of a solution or a melt by heat by means of a roll mill, a kneader mill, or a bead mill, and yielding as a solid kneaded product (the solid color compound).

If a finer dispersion is required, it is preferable to select a method, among conventional methods, of dispersion under relatively high shearing force, that is, a method of dispersion by means of a twin rollers under high shearing force.

<2> obtaining a suspension of the color agent which contains at least a part of coating resin in a dissolved state by mixing water, an organic solvent to dissolve the coating resin, and the solid color compound (suspension process).

The organic solvent used to dissolve the coating is selected among good solvents for said resin. Examples of solvents which dissolve the coating resins include ketone type solvents such as acetone, dimethylketone, and methylethylketones; alcohol type solvents such as methanol, ethanol, and isopropylalcohol; chlorine type solvents such as chloroform and ethylene chloride; aromatic solvents such as benzene, toluene etc.; ester type solvents such as acetoethylester; glycolethers such as ethyleneglycolmonomethylether, ethyleneglycoldimethylether; and amides.

The dispersion medium used in the present invention is mainly water, which acts as a poor solvent for the coat forming resin and it is preferable for the dispersion medium for the jet ink to use water with a purity greater than deionized water.

In the above processes of the present invention, it is preferable to use a homogeneous mixture of water and the organic solvent, and if the uniformity is not sufficient, if necessary, it is preferable to add a surface active agent, to emulsify mechanically into O/W emulsion, or to add a auxiliary solvent.

In the case when it is difficult to obtain a homogeneous dispersion by merely using the organic solvent to dissolve said resin, water and a base, a hydrophilic organic solvent which dose not dissolve said resin may be added as a auxiliary solvent to the above dispersion so as to aid the emulsification stability. Either for the organic solvent and the auxiliary solvent, it may be possible to use only one kind or combinations of two kinds or more.

If the coat forming resin is a copolymer of (meth)acrylic acid and at least one monomer selected from the group consisting of styrene, substituted styrene, and (meth) acrylatester, it is preferable to use a combination of ketone type solvents such as methylethylketone as a main organic solvent and alcohol type solvents such as isopropylalcohol as an auxiliary solvent.

Although there is no limitation in the ratio of water and the organic solvent, it is preferable to select a ratio of water/organic solvent within a range of 10/1 to 1/1.

According to this process, a suspension of the color agent is obtained in a state that the coat forming resin having the acid value is in self emulsification by the aids of the organic solvent and the base and that at least a part of the resin is dissolved from the surface of the solid color compound.

When the coating resin is completely dissolved in the liquid medium, the surface of the color agent is exposed. However, when the resin is in self emulsification state, it is assumed that at least a part of the color agent is covered with the resin.

In this process, all or a part of the acid values of the coat forming resin having an acid value existing on the surface of the solid color compound is gradually neutralized by the base, and the solid color compound changes from a solid state to a suspended state.

Any conventional and known technique may be adopted for stirring to obtain the suspension, and it is possible to obtain a suspension by the use of a uniaxial propeller-type mixing blade or by the use of any shapes of stirring blades or the stirring container in response to the purpose.

When the color particles cannot be pulverized to fine particles by the stirring in the <2> process due to lack of the shearing force, or when the color agents have a tendency to coagulate each other, it is preferable to apply high shearing force to pulverize into fine particles and to obtain higher dispersion stability of the suspension. For this purpose, for example, it is preferable to use a particular type of dispersing apparatus such as a high pressure homogenizer or a beadless dispersion apparatus known as Microfluidizer or Nanomizer (brand names), which are preferable in preventing recohesion of the color agents.

For example, when a suspension including color agent particles pulverized into comparatively small particle diameter in the suspension process, reprecipitation process <3> should be performed immediately after the suspension process. On the other hand, when the solid color compound contains an organic pigment as the color agent, or when the solid color compound contains an inorganic pigment such as carbon black, it is preferable to include an another process of exposing the suspension under high shearing force in between the suspension process <2> and the re-deposition process <3>, in order to increase the stability of the suspension of the former compound and also in order to convert the color agent particles in the suspension of the latter compound into finer particles.

<3> depositing the coat forming resin dissolving in the color agent suspension on the surface of the color agent particles (reprecipitation process).

By this processing, microcapsules are obtained by the deposition of the coat forming resin on the pigment surface.

This process is to precipitate the coat forming resin component dissolving in the pigment suspension on the color agent surface. The term "reprecipitation" does not mean to precipitate and to separate from the liquid medium the color particles in the state of half-capsules, in which the coat forming resin dissolving in the suspension is adsorbed on color agent surfaces. Therefore, what is obtained in this process is not merely a mixture of the solid component and liquid component, but a stable suspension of the color resin particles is obtained, in which the coated color agent particles adsorbed the dissolved resin on the surfaces are suspended in the liquid medium of the suspension.

In the case when the suspension of the color agent is the suspension of the pigment, this process is to precipitate or to deposit the resin dissolving in the suspension on the surface of the pigment. The term "redeposition" does not mean to separate the particles in a half-capsule state in which the pigment is already adsorbed the pigment or the dissolved resin. Therefore, what is obtained in this process is not merely separated materials composed of the separated solid materials and the liquid, but a stable suspension is obtained, in which the coated color agent particles adsorbed the dissolved resin on their surfaces are suspended in the liquid medium of the suspension.

That is, deposition or precipitation of the dissolved resin on the surface of the color particles which surface is coated with the free color agent and/or the self water-dispersing resin in the suspension is carried out in the suspension, while the color agent particles obtained by coating free color agent and/or the self water dispersing resin are dispersed in the dispersion medium of water.

Deposition or precipitation of the dissolved resin on the surface of the color particle surface which is covered with free color agent and/or the self water-dispersing resin can be carried out by reducing the solubility of the resin component of the dissolved resin in water.

In general, the reduction of the solubility of the resin component of the dissolved resin is performed by methods comprising addition of a necessary amount of a poor solvent in the aqueous medium containing the dissolved resin, or removal of a necessary amount of a chemical component which dissolve the resin component from a suspension system. Thereby, the dissolved resin preferentially approaches the surface of the free color agent and/or the color agent particles which is covered with the self water-dispersing resin, and the dissolved resin is accumulated and deposit on these surfaces to be in a compressed state.

The deposition of the dissolved resin on the color agent surfaces in the suspension process can be easily carried out by, for example, ① addition of an aqueous medium, which acts as a poor solvent for said resin, in the suspension of the color agent containing the coat forming resin at least a part of which is in a dissolved state, or ② removal of the organic solvent from the suspension of the color agent.

However, from a point of view of preventing coagulation of particles, it is more preferable to apply a method to add the aqueous medium which acts as the poor solvent. The deposition is carried out by dropping the aqueous medium while stirring the suspension slowly, thereby the deposition of the resin on the color particles is ensured while preventing the pigment coagulation.

For ensuring the deposition of the resin, it is preferable to implement the deposition after, ① the addition of an aqueous medium which acts as the poor solvent into a pigment suspension containing a coat forming resin in a dissolved state or in a dispersed state, and then ② removal of an organic solvent in the pigment suspension.

Furthermore, in order to prevent the dispersion from drying, it is preferable to add a desiccant into the dispersion in advance or after the deposition process.

When the thus-obtained dispersion is utilized as an ink, the suspension is treated so as to enable use as a jet ink and also to ensure the stable emission of the ink.

In order to use the dispersion as the recording medium in the ink-jet recording, the average particle diameters are reduced to submicron particles (less than 1 $\mu$m).

The water dispersion containing color resin particles of submicrons in diameter, which is obtained by a method of making a water dispersion of color resin particles shows appropriate properties as an aqueous jet ink in the stability of dispersion and in the emission property of the ink-jet. As described in detail hereinafter, in the case when the present method of making the water dispersion of the color resin particles is applied, a quite stable dispersion with superior dispersion stability, and an excellent aqueous jet ink are obtained by the addition of the desiccant into the suspension during the suspension process (2).

In the manner described above, preferable color resin particles with a desired particle size are obtained by the above <1> kneading process, <2> suspension process, and <3> redeposition process, and generally the average particle diameters are restricted within a range of more than 0.01 to less than 1 $\mu$m.

<4> removal and/or concentration process of the organic solvent having low boiling points from the dispersion of microcapsules obtained in the redeposition process (desolventing process).

Although the suspension of the color resin particles obtained in the re-deposition process can be used as obtained, it is preferable to implement desolventing for improving the stability of dispersion during storage and fire safety or the pollution, since the color resin particles are in a swelled state because of the co-existing organic solvent.

The organic solvent removed in this process is reusable by recycling in a closed system without being disposed by burning, when the continuous production is desired.

The water suspension of the color resin particles obtained through processes from <1> to <4> is solely a water dispersion of the color microcapsules originated from the resin and the pigment which are originally prepared, and the suspension is substantially free from any three materials of "free pigment particles", "particles formed only by the coat forming resin", and "dissolved coat forming resin". However, since it is very difficult to eliminate the dissolved resin component, in general, the content of the dissolved resin component in a total mass of the suspension constituents is made at an level of more than 0.01% by mass.

Thus, the obtained dispersion is substantially composed of the color microcapsules which is the pigment coated with the coat forming resin and the dispersion medium. The content of the color microcapsules is designed to be within a range of 10 to 40% by mass to the sum of the microcapsules and the dispersion medium and additives, if added.

A jet ink of the present invention comprising the fine color particles which are the pigment particles (a) coated by a coat forming resin and which is dispersed in an aqueous medium, wherein, (1) the surface of the fine color particles (d) are covered with the quaternary carboxyl groups of the resin and the average diameter of the fine color particles is less than 0.5 $\mu$m, and (2) "the increase rate of the average volume diameter of the fine color particles in a redispersion of the dried ink" is less than 50%. It is preferable to adopt a hereinafter-described method of producing such jet ink, which comprises the steps of:

(1) homogeneously mixing (i) a color compound (V) obtained by kneading the pigment, (ii) an aqueous medium (W) composed of water and a solvent (e) which is able to dissolve the coat forming resin (b), and (iii) a base compound (c);

(2) coating the fine pigment particles (a) with the coat forming resin containing carboxyl groups (b), and producing the dispersion (X) by dispersing the fine color particles of the fine color particles having the carboxyl groups being on the coat surface into the aqueous medium; and subsequently (3) depositing the coat forming resin (b) dissolved in the aqueous medium on the surface of the dispersion medium of the fine color particles by addition of a poor solvent for the coat forming resin to the dispersion of the fine color particles, and then removing the organic solvent from the dispersion.

In the case when the dissolved coat forming resin having quaternarized carboxyl groups (that is, in salt structure) is not present in the dispersion (X) or when the fine color particles (d) in the dispersion is sufficiently stable, it is not necessary to dare add the poor solvent of the coat forming resin, and merely remove the organic solvent (e).

<5> ink forming process

The dispersion of the fine color particles of submicron size, which contains merely or almost exclusively water may be used as an ink. However, it is preferable to adjust the property of the dispersion to ensure the dispersion stability and the emission property.

In general, as described hereinafter, the adjustment is carried out by filtering the dispersion through a filter having a desired opening to obtain an ink provided as a dispersion containing smaller particles than the nozzle diameter dispersed in a liquid medium.

The adjustment includes, for example, the addition of a desiccant and an pentrant, adjustment of concentration and viscosity, and if necessary, addition of a pH adjusting agent, a surface active agent to control the dispersion, foaming, and penetration into paper, a preservative agent, a chelating agent, a plasticizer, an anti-oxidant, an ultra-violet light absorber, etc.

However, it is necessary to use an additive selecting from the group of compounds which do not dissolve the resin coating on the color microcapsules or to add a limited amount so as not to substantially dissolve the coating, even if a selected additive dissolves the coating.

When the recording medium is made of non-permeating materials such as glass or a metal-film, it is possible to add other water soluble resins besides the coat forming resin in an amount so as not to affect the emission property.

In order to avoid the clogging of the nozzle by a coarse particle, coarse particles are removed by centrifugal separation or by filtering after the desolventing process of <4>, or by filtering in the ink adjustment process of <5>.

The water dispersion-type aqueous ink of color microcapsules according to the present invention may be applied to any conventional and known ink-jet printers such as the Piezo-type or the on-demand-type printers. In addition, the ink of this invention may be applied for forming images on papers, resin coated sheets, single purpose papers for ink-jet printing, glass, metals, pottery, and porcelain.

The water dispersion-type aqueous ink of color microcapsules according to the present invention is superior in transparency and color development, and can be used as a general ink, a paint, and a color filter, in addition to ink-jet printing.

Examples of various inks obtained according to the present invention will be described hereinafter.

1. An water dispersion type aqueous ink containing fine colored resin particles the diameter of which is smaller than that of the jet-nozzle, wherein the ink realizes the stable emission without clogging the nozzle, and is superior in stability of dispersion during storage and in water proof quality of the printed matter and the ink is obtained by the following processes.

[1] A resin coloring process for obtaining a solid color compound by dispersing at least a pigment in the coat forming resin having an acid value.

[2] A suspension process for obtaining a pigment suspension by first mixing the solid color compound with at least water, an organic solvent which dissolve the coat forming resin, a base for minimizing the amount of the coat forming resin, and adjusting the coat forming resin so as to be self dispersed in water and a part of the coat forming resin is dissolved in the suspesion.

[3] A reprecipitation process for minimizing the amount of the water soluble resin component by desolventing the organic solvent from said suspension after adding an aqueous medium which acts as the poor solvent, and depositing the dissolved resin component on the pigment surface in the suspension obtained by the above process.

2. An aqueous dispersion type jet ink of color microcapsules comprising color microcapsules obtained by coating a pigment with a coat forming resin which is self water dispersing in nature contained in an aqueous medium, wherein the percentage content of the coat forming resin dissolved in the ink is within a range of 0.1 to 2% by mass.

3. An aqueous dispersion type jet ink of color microcapsules comprising color microcapsules obtained by coating a pigment with a coat forming resin which is self water dispersing in nature contained in an aqueous medium, wherein the percentage content of the coat forming resin dissolved in the ink is within a range of 0.1 to 1% by mass.

4. An aqueous dispersion type jet ink of color microcapsules comprising color microcapsules obtained by coating a pigment with a coat forming resin which is self water dispersing in nature contained in an aqueous medium, wherein the percentage content of the coat forming resin dissolved in the ink is within a range of 0.01 to 2% by mass.

5. An aqueous dispersion type jet ink of color microcapsules comprising color microcapsules obtained by coating a pigment with a coat forming resin which is self water dispersing in nature contained in an aqueous medium, wherein the absolute percentage content of the coat forming resin dissolved in the ink is within a range of 0.1 to 1% by mass.

6. An ink recited in the above 1, 2, 3, and 4, wherein the pH of the ink is in a range of 7.5 to 9.0.

7. An ink recited in the above 1, 2, 3, 4, and 5, wherein the coat forming resin with the self dispersion property in water has a weight average molecular weight of 30,000 to 100,000.

8. An ink recited in the above 2, 3, 4, 5, 6, and 7, wherein the microcapsules are obtained by implementing the following processes in order.

[1] A resin coloring process for obtaining a solid color compound by dispersing at least a pigment in a coat forming resin having an acid value.

[2] A suspension process for obtaining a pigment suspension by first mixing the solid color compound with at least water, an organic solvent which dissolve the coat forming resin, a base for minimizing the amount of the coat forming resin, and adjusting the coat forming resin so as to be self dispersed in water and a part of the coat forming resin is dissolved in the suspesion.

[3] A reprecipitation process for precipitating the dissolved rein component on the pigment surface in the pigment suspension obtained by the above process.

9. An ink recited in the above 2, 3, 4, 5, 6 and 7, wherein the color microcapsules are obtained by implementing the following processes in order.

[1] A resin coloring process for obtaining a solid color compound by dispersing at least a pigment in a coat forming resin having an acid value.

[2] A suspension process for obtaining a pigment suspension by first mixing the solid color compound with at least water, an organic solvent which dissolve the coat forming resin, a base for minimizing the amount of the coat forming resin, and adjusting the coat forming resin so as to be self dispersed in water and a part of the coat forming resin is dissolved in the suspension.

[3] A reprecipitation process for precipitating the dissolved resin component on the pigment surface in the pigment suspension obtained by the above process by lowering the solubility of the resin component in the aqueous medium.

10. An ink recited in the above 2, 3, 4, 5, 6, 7, wherein the color microcapsules are obtained by implementing the following processes in order.

<1> A resin coloring process for obtaining a solid color compound by dispersing at least a pigment in a coat forming resin having an acid value.

<2> A suspension process for obtaining a pigment suspension by first mixing the solid color compound with at least water, an organic solvent which dissolves the coat forming resin, a base for minimizing the amount of the coat forming resin, and adjusting the coat forming resin so as to be self dispersed in water and a part of the coat forming resin is dissolved in the suspension.

<3> A reprecipitation process by desolventing the organic solvent from said suspension after adding an aqueous medium which acts as the poor solvent, and depositing the dissolved resin component on the pigment surface in the suspension obtained by the above process.

11. An ink recited in the above 2, 3, 4, 5, 6, and 7, wherein the color microcapsules are obtained by implementing the following processes in order.

<1> A resin coloring process for obtaining a solid color compound by dispersing at least a pigment in a coat forming resin having an acid value.

<2> A suspension process for obtaining a pigment suspension by first mixing the solid color compound comprising at least water, an organic solvent which dissolve the coat forming resin, and a base, for minimizing the amount of the coat forming resin, and adjusting the coat forming resin so as to be self dispersed in water and a part of the coat forming resin is dissolved in the suspension.

<3> A reprecipitation process for minimizing the amount of the water soluble resin component by desolventing the organic solvent from said suspension after adding an aqueous medium which acts as the poor solvent, and depositing the dissolved resin component on the pigment surface in the suspension obtained by the above process by lowering the solubility of the resin component in the aqueous medium.

12. An ink recited in the above 1, 2, 3, 4, 5, 6, 7, 8, 9, 10, and 11, wherein both the pigment and the coat forming resin having an acid value are used at an identical mass or the pigment is used at an mass within a range of ±15% of said resin.

13. An ink recited in the above 2, 3, 4, 5, 6, and 7, wherein the coat forming resin with the self dispersion property in water having an acid values within a range of 50 to 180 mg KOH/g is used after it is neutralized corresponding to an degree of neutralization of less than 60% of the acid value.

14. In ink recited in the above 1, 8, 9, 10, and 11, wherein the coat forming resin with the self dispersion property in water having an acid values within a range of 50 to 180 mg KOH/g is used after it is neutralized corresponding to an degree of neutralization of less than 60% of the acid value.

15. An ink in which fine color particles (d) formed by coating fine pigment particles (a) with the coat forming resin having a carboxyl group (b) are dispersed in an aqueous medium, wherein (1) said fine color particles (d) comprise quaternary carboxyl groups on their surfaces and (2) "the rate of increase of the average volume diameter of fine color particles dispersed in the redispersion liquid" is less than 50%.

16. An ink recited in the above 15, wherein an amount of the coat forming resin which is dissolved in the aqueous medium is less than 2% by weight of the ink.

17. An ink recited in the above 15 and 16, wherein the standard deviation of "the frequency distribution of the average volume diameter of the fine color particles in the redispersion liquid of the dried ink" is less than 0.15.

18. An ink recited in the above 15, 16, and 17, wherein said coat forming resin has the acid value within a range of 50 to 180 and all or a part of the acid values are converted into the quaternary ammonium salt by the organic amines.

19. A method of making an ink comprising the steps of:

(1) homogeneously mixing (i) a color compound (V) obtained by kneading a pigment and a coat forming resin having carboxyl groups (b), (ii) an aqueous medium (W) composed of water and an organic solvent (e) which can dissolve the coat forming resin (b), and (iii) an basic compound (c);

(2) making a dispersion (X) of the color fine particles (d) in said aqueous medium (W), wherein the color fine particles (d) are obtained by coating the fine pigment particles (a) with the coat forming resin having carboxyl groups (b), and comprising quaternary carboxyl groups at the surface of the coating; and, subsequently (3) removing the organic solvent from the dispersion (X).

20. A method recited in the above 19, further comprise the step of precipitating, on the surface of the fine color particles (d), the coat forming resin (b) which is dissolved in the aqueous medium of the dispersion (X) of the fine color particles by the addition of a poor solvent for the coat forming resin (b), and subsequently removing the organic solvent (e) from the dispersion (X).

21. An ink recited in the above 1, 2, 3, 4, 5, 6, 7, 8, 9, 10, 11, 12, 13, 14, 15, 16, 17, 18, 19, and 20, wherein the ink uses an single addition product of one mole of propylene oxide to a monoalcohol.

22. An ink recited in the above 1, 2, 3, 4, 5, 6, 7, 8, 9, 10, 11, 12, 13, 14, 15, 16, 17, 18, 19, 20, and 21, wherein the ink uses a single addition product of one mole of propylene oxide to monoalcohol of 1 to 6 carbon atoms.

23. An ink recited in the above 1, 2, 3, 4, 5, 6, 7, 8, 9, 10, 11, 12, 13, 14, 15, 16, 17, 18, 19, 20, 21, and 22, wherein the ink uses a single addition product of one mole of propylene oxide to monoalcohol of 4 to 8 carbon atoms.

24. An ink recited in the above 1, 2, 3, 4, 5, 6, 7, 8, 9, 10, 11, 12, 13, 14, 15, 16, 17, 18, 19, 20, 21, 22, and 23, wherein the ink uses at least two compounds selected from the group consisting of a single addition product of one mole of propylene oxide to monoalcohol, a single addition product of one mol of propylene oxide to monoalcohol of 1 to 6 carbon atoms, and a single addition product of one mole of ethylene oxide to monoalcohol of 4 to 8 carbon atoms.

25. An ink recited in the above 1, 2, 3, 4, 5, 6, 7, 8, 9, 10, 11, 12, 13, 14, 15, 16, 17, 18, 19, 20, 21, 22, 23, and 24, wherein the pigment is a pigment selected from the group consisting of carbon black, a phthalocyanine pigment, a phthalocyan halide pigment, a quinacrydone pigment, a benzimidazolone pigment, a penorine pigement, and a isoindolinone pigment.

26. A method of making an ink recited in the above 19, 20, 21, 22, 23, and 24, wherein the method further comprising the step of removing coarse particles, the diameter of which exceed 0.5 $\mu$m from the suspension.

A preferable embodiment of the present invention will be explained hereinafter, using a method of making an ink for ink-jet recording as an example. The method comprises the steps of:

(1) obtaining a solid color compound by dispersing a resin composed of a copolymer of coat forming styrene and (meth)acrylate, which has a weight average molecular weight in a range of 10,000 to 100,000, and has an acid value in a range of 50 to 180 based on carboxyl groups;

(2) preparing a solution substantially of water by using together with water organic solvents with low boiling points for dissolving the coating resin composed of the main solvent of methylethylketone and an auxiliary solvent of isopropyl alcohol which acts as a solvent aid of methylethylketone, and is also water soluble, alcohol amine as a base to neutralize the acid to a neutralization degree corresponding to 60% by mole of the acid values, and an additive of glycerin as a desiccant, and then mixing the solid color compound obtained in the above step (1) with this solution to obtain a suspension of the pigment while stirring. In addition, it is preferable to perform stirring to obtain a more stable dispersion under high shearing force by using a dispersing apparatus such as a Nanomizer (a brand name) in order to avoid recoagulation.

(3) obtaining a water dispersion fluid composed merely of color resin particles (color microcapsules) of an average diameter of more than 0.01 and less than 1 $\mu$m by dropping a solution of glycerin while stirring. The amount of resin dissolved in the dispersion is made to be less than 0.1 to 1.0% by mass.

(4) obtaining an ink base by removing methylethylketone and isopropyl alcohol from the obtained aqueous dispersion of the color resin particles.

(5) obtaining an jet ink containing 0.5 to 20% by mass of said color microcapsules converted as the pigment and with pH of 7.5 to 11, after adjusting the concentration and the characteristics of the ink base by the addition of ink-adjusting agents. The content of the coat forming resin dissolved in the ink is adjusted in the range of 0.1 to 1.0% by mass.

The present invention will be described in more detail hereinafter by the described Examples and Comparative Examples. The unit "parts" used the following Examples and Comparative Examples represent "parts by mass".

The diameters of the fine color particles (the color microcapsules) are measured by Microtrac Ultrafine Particle Analyzer produced by Reeds and Northrup Co. When measuring the average volume diameter of said fine color particles, the slide glass with a hole defined in the aforementioned section of the present specification is used.

EXAMPLE 1

20 parts of a twin-rolled kneaded product composed of 20 parts of carbon black and 20 parts of a styrene-acrylic acid-methacrylic acid resin (styrene/acrylic acid/methacrylic acid=77/10/13; molecular weight=50,000; acid value=160) was put into a mixed solution of 210 parts of water, 35 parts of glycerin, and 8 parts of triethanolamine, 90 parts of methylethylketone, and 40 parts of isopropylalcohol, and a suspension of the color agent was obtained by stirring for 3 hours at room temperature.

A black color resin dispersion was then obtained by dropping a mixture of 30 parts of glycerin and 210 parts of water at a speed of 5 ml/minute, while stirring. Methylethylketone and isopropyl alcohol were removed from the thus-obtained capsule solution by a rotary evaporator and a water dispersion of the black color resin particles was finally obtained. An ink for the ink-jet recording was obtained after filtering the water dispersion using a filter with 1 µm pores.

The microcapsules in the thus-obtained aqueous ink had an average particle diameter of 0.09 µm, and the ink exhibited a long-term stability without showing cohesion, the recorded letters by the Piezo-type ink-jet printer was stable, and the printed matter obtained by the ink showed clear black color without bleeding, as well as good water proof quality. The microcapsules in the aqueous ink was precipitated by an ultra centrifuge separator under the centrifugal conditions at an acceleration of 9.8 km/s$^2$ for 3 hours, and the pigment coated with the coat forming resin was obtained by drying the precipitate at 105° C. for 140 hours. The resin component dissolved in the ink was measured as 0.3% by mass obtained through the measurement of the ratio of the resin and the pigment by thermal analysis. The ink showed stable storage properties without cohesion of color particles and the printing matter obtained by the present ink was superior in water proof and light fastness qualities after storage of one year at room temperature.

COMPARATIVE EXAMPLE 1

The same composition as that of Example 1 except methylethylketone (a good solvent to dissolve the coat forming resin) was twin-roll kneaded. However, the kneaded compound could not be dissolved in the same water based medium as that of Example 1, and the dispersion to prepare the ink was not obtained.

EXAMPLE 2

(First Example of Magenta Inks)

40 parts of a twin-rolled kneaded product composed of 40 parts of quinacridone and 40 parts of a styrene-acrylic acid-methacrylic acid resin (styrene/acrylic acid/methacrylic acid=77/10/13; molecular weight=50,000; acid value=160) was put into a mixed solution of 250 parts of water, 22 parts of glycerin, and 8 parts of triethanolamine (corresponds to 50 mol % of acid groups), 90 parts of methylethylketone, and 40 parts of isopropylalcohol, and, after stirring for 3 hours at room temperature, a dispersion of the color agent was obtained by a dispersion treatment by means of a collision type disperser, Nanomizer (prodeced by Nanomizer Inc.) under a pressure of 98 Mpa.

A magenta color resin dispersion was then obtained by dropping a mixture of 22 parts of glycerin and 250 parts of water at a speed of 5 ml/minute while stirring. Methylethylketone and isopropyl alcohol were removed from the thus-obtained capsule solution by a rotary evaporator and a water dispersion of the magenta color resin particles was finally obtained. An ink for the ink-jet recording was obtained after filtering the water dispersion using a filter with 1 µm pores.

The color resin particles in the aqueous ink had an average particle diameter of 0.12 µm, and the ink showed a long-term stability in the dispersion properties without any cohesion and the printing operation was stable in the ink-jet printing by a Piezo-type ink-jet printer. The printed matter printed by the present ink exhibited very clear magenta color without any bleeding and was superior in water proof and light fastness qualities.

The microcapsules in the aqueous ink was precipitated by an ultra centrifuge separator under the centrifuging conditions at the acceleration of 9.8 km/s$^2$ for 3 hours, and the coat forming resin and the pigment was isolated by drying the precipitate at 105° C. for 140 hours. The ratio of the coat forming resin and the pigment was measured by thermal analysis of the dried precipitate, and the content of the resin dissolved in the ink was obtained as 0.3% by mass. This ink showed stable dispersion properties without cohesion of color particles after storage for one year and the printed matter obtained by the present ink was superior in water proof and fade resistance qualities even after storage for one year at room temperature.

EXAMPLE 3

(Second Example of Magenta Inks)

16 parts of twin-rolled kneaded product composed of 8 parts of quinacridone and 40 parts of a styrene-acrylic acid-methacrylic acid resin (styrene/acrylic acid/methacrylic acid=77/10/13; molecular weight=50,000; acid value=160) was put into a mixed solution of 46 parts of water, 4 parts of glycerin, and 1 parts of triethanolamine (corresponds to 50 mol % of acid groups), 18 parts of methylethylketone, and 8 parts of isopropylalcohol, and, after stirring for 3 hours at room temperature, a pigment dispersion was obtained by a dispersion treatment by means of the disperser, a Nanomizer (produced by Nanomizer Inc.) under a pressure of 98 Mpa.

A magenta color resin dispersion was then obtained by dropping a mixture of 22 parts of glycerin and 250 parts of water at a speed of 5 ml/minute, while stirring. Methylethylketone and isopropyl alcohol were removed from the thus-obtained capsule solution by a rotary evaporator and a water dispersion of the magenta color resin particles was finally obtained.

Subsequently, 3 parts of glycerin as a desiccant and 5 parts of propyleneglycolpropylether were added to 92 parts of this color resin dispersion and the concentration of the microcapsules in the dispersion was adjusted to be 2.7% by mass as the conversion to the pigment while stirring, and after filter by a filtering using a filter with 1 μm pores, an aqueous ink for the ink-jet recording was obtained.

The microcapsules in the thus-obtained aqueous ink had an average particle diameter of 0.15 μm and the pH of the ink was 8.4. The microcapsules in the aqueous ink was precipitated by an ultra centrifuge separator under the centrifuging conditions at the acceleration of 9.8 km/s² for 3 hours, and the pigment and the coat forming resin was isolated by drying the precipitate at 105° C. for 140 hours. The ratio of the coat forming resin and the pigment was obtained by the thermal analysis of the dried precipitate and then a content of the resin dissolved in the ink was 0.4% by mass.

The ink obtained by the above process showed a stable dispersion properties without any cohesion after storage for one year. The printing operation using this ink by the Piezo-type ink-jet printer was stable and the printed matter by this ink exhibited a clear magenta color (printing concentration: 1.30), and the printing concentration after the just-printed printed matter was immersed for 24 hours in distilled water showed the same value of 1.30.

EXAMPLE 4

(Third Example of Magenta Ink)

An ink was prepared by addition of 0.1 part of a additive polymer of butanol with propylene oxide (average molar number of addition of propylene oxide is 17.7) to 100 parts of the ink obtained in Example 3 and by sufficient stirring.

The average particle diameter of the microcapsules in this ink was 0.15 μm and the pH of this ink was 8.4. The content of the coat forming resin dissolved in this ink was 0.4% by mass when measured by the same procedure as Example 3.

This ink showed the stable dispersion properties without any cohesion after storage for one year and ensured more stable printing operation. The printed matter just after printing dried far faster, almost instantaneously, than the ink obtained in Example 3. The printed matter obtained by this ink showed a proper bleeding and was superior in smoothness in the solid printing portion, exhibiting a clear magenta color (printing concentration: 1.30). After the just printed matter was immersed in distilled water for 24 hours, the printing concentration of the printed matter was maintained at the same value of 1.30 as that obtained just after printing.

EXAMPLE 5

(Fourth Example of Magenta Ink)

An ink was prepared by adding 1 part of ethyleneglycolhexylether to 100 parts of ink obtained in Example 4.

The average particle diameter of the microcapsules in this ink was 0.15 μm and the pH of this ink was 8.4. The content of the coat forming resin dissolved in this ink was 0.6% by mass when measured by the same procedure as that of Example 3.

The obtained ink showed a stable dispersion property without any cohesion after storage for one year and the printing operation using this ink was more stable than that of the ink of Example 4, and a print made by this ink dried instantaneously, far faster than prints made by inks of Examples 3 and 4.

The obtained printed matter showed proper bleeding, and a solid printed portion was superior in smoothness, exhibiting a clear magenta color (the printing concentration: 1.35), and the print concentration was the same 1.35, without showing any change after the print was immersed for 24 hours in distilled water.

EXAMPLE 6

(An Example of Cyan Ink)

A water dispersion was prepared by using C. I. Pigment Blue 15:4, instead of the pigment of Example 3.

3 parts of glycerin as the desiccant and 5 parts of propylalcohol as the penetrant were added to 100 parts of said water dispersion and the content of microcapsules was adjusted to be 2.5% by mass, as the conversion to the pigment content. After stirring and filtering using a 1 μm filter, an ink for ink-jet recording was obtained.

The average particle diameter of the microcapsules in this aqueous ink was found to be 0.17 μm, and pH of this ink was 8.6. The content of the coat forming resin dissolved in this ink was 0.2% by mass, when the same measurement as shown in Example 3 was performed.

This ink showed a very stable dispersion property even after storage for one year at room temperature and the ink secured the stable printing operation in the printing operation by a Piezo-type ink-jet printer, and a print exhibited a clear cyan color (the print concentration: 1.30), and the print concentration was maintained at the same value of 1.30 as that of the just printed print after the print was immersed in distilled water for 24 hours.

This ink showed a very stable dispersion without causing any cohesion after storage for a year in a glass vessel at room temperature, and the printing operation was very stable without causing clogging. The general printed matter showed a clear color and showed a superior water proof quality.

EXAMPLE 7

(Example of Yellow Ink)

An water dispersion was prepared by the addition of C. I. Pigment Yellow 151 instead of the pigment of Example 3. 3 parts of glycerin as a desiccant and 5 parts of propylglycolpropylether as a penetrant was added to 92 parts of said water dispersion, and the content of microcapsules was adjusted to 3.3% by mass as the pigment content while stirring, and the thus-prepared dispersion was filtrated using 1 μm filter to yield an ink for the ink-jet recording.

The average particle diameter of microcapsules in this ink was 0.18 μm and the pH of this ink was 8.4. The measured content of the coat forming resin dissolved in the ink was 0.5% by mass when measured by the same procedure as that of Example 3.

This ink showed a very stable dispersion property even after storage for one year at room temperature and this ink ensured stable printing operation in the printing operation by a Piezo-type ink-jet printer, and a print exhibited a clear cyan color (the print concentration: 1.17), and the print concentration was maintained at the same value of 1.17 as that of the just-printed print after the print was immersed in distilled water for 24 hours.

This ink showed a very stable dispersion without causing any cohesion after storage for one year in a glass vessel at room temperature, and the printing operation was very stable without causing clogging. The general printed matter showed a clear color and showed a superior water proof quality.

This ink showed a very stable dispersion without causing any cohesion after storage for year in a glass vessel at room temperature, and the printing operation was very stable without causing clogging. The general printed matter showed a clear color and showed a superior water proof quality.

This ink showed a very stable dispersion without causing any cohesion after storage for one year in a glass vessel at room temperature, and the printing operation was very of the print after immersed in distilled water for 24 hours increased to 1.35 which is higher than the original concentration.

The average volume diameters of the fine color particles in the just prepared ink, "the rates of increase of the average volume diameter of the fine color particles in the redispersion of the dried ink", and the standard deviations (sd) of the volume particle diameters of each Example are shown in Table 1.

In respective inks of the above Examples, it was found that the change was negligibly small in the average volume diameters of either microcapsules in a just prepared ink and in a respective ink, the same just prepared ink of which was packed and sealed in a vessel and stored for one year at room temperature.

TABLE 1

|  | JUST PREPARED INK | | WATER DISPERSION OF DRIED INK | | INCREASE RATE |
| --- | --- | --- | --- | --- | --- |
|  | AVERAGE VOLUME PARTICLE DIAMETER S1 ($\mu$m) | STANDARD DEVIATION OF VOLUME PARTICLE DIAMETER (sd1) | AVERAGE VOLUME PARTICLE DIAMETER S2 ($\mu$m) | STANDARD DEVIATION OF VOLUME PARTICLE DIAMETER (sd2) | OF AVERAGE VOLME PARTICLE DIAMETER [(S2/S1) − 1] × 100 (%) |
| Example 1 | 0.09 | 0.03 | 0.10 | 0.05 | 11 |
| Example 2 | 0.12 | 0.04 | 0.14 | 0.06 | 17 |
| Example 3 | 0.15 | 0.05 | 0.18 | 0.09 | 20 |
| Example 4 | 0.15 | 0.05 | 0.20 | 0.09 | 33 |
| Example 5 | 0.15 | 0.06 | 0.20 | 0.10 | 33 |
| Example 6 | 0.17 | 0.07 | 0.18 | 0.06 | 6 |
| Example 7 | 0.18 | 0.08 | 0.21 | 0.10 | 17 |
| Example 8 | 0.09 | 0.02 | 0.09 | 0.03 | 0 | stable without causing clogging. The general printed matter showed a clear color and showed a superior water proof quality.

This ink showed a stable dispersion property after storage for one year in a glass vessel at room temperature and secured a stable printing operation when the printing was performed by the Piezo-type ink-jet printer. The general prints obtained by this ink exhibited clear color and were superior in water proof quality.

EXAMPLE 8

(Example of Black Ink)

An water dispersion was similarly prepared by adding carbon black instead of the pigment shown in Example 3. 3 parts of glycerin as a desiccant and 5 parts of propyleneglycolpropylether as a penetrant were added to 92 parts of the dispersion and the content of the color microcapsules was adjusted to be 3.7% by mass as the converted content of the pigment while stirring and an aqueous ink for the ink-jet recording was obtained after filtering using the 1 $\mu$m filter.

The average particle diameter of the microcapsules in this ink was 0.09 $\mu$m and the pH of this ink was 8.5. The content of the coat forming resin dissolved in the ink was determined as 0.6% by mass by the same measurement as shown in Example 3.

This ink showed a stable dispersion property without any cohesion even after storage for one year and the ink ensured stable printing operation by a Piezo-type ink-jet printer. The print made by this ink exhibited a clear and almost pure black (print concentration: 1.32), and the print concentration Industrial Applications The color resin particles in the water dispersion of the color resin particles obtained by the method of producing the water dispersion of the color resin particles of the present invention are fine in particle diameter and the dispersion system is superior in dispersion property. Thus, when the dispersion system is used as an ink for the ink-jet printing, the ink based on this water dispersion system shows good dispersion stability and enables stable emission of an ink-jet without clogging of the jet nozzle, and without sacrificing its superior characteristics in the printing properties such as the print quality, the water proof quality, and the fading resistance property.

Since the water dispersion type jet ink containing color microcapsules obtained according to the present invention is to include a limited amount of the coat forming resin dissolved in the ink to less than 25% by mass, the rate of increase of the average volume diameter of the fine color particles in the re-dispersed solution is reduced to less than 50%, so that the ink has particularly remarkable technical effects in its high dispersion stability and in the stable emission property and a superior fixing property of the image on the recording medium.

Therefore, the ink of the present invention exhibits superior dispersion stability and ensures stable emission in the ink-jet printing without clogging the jet nozzle, without sacrificing the excellent properties of the resin-particle water dispersion type aqueous ink such as superior print quality, and superior water proof and fading resistance qualities.

What is claimed is:

1. A jet ink comprising an aqueous dispersion of fine color particles which is formed by coating fine pigment particles with a coat forming resin having carboxyl groups, wherein (1) said fine color particles have quaternary carboxyl groups on the surface, and have an average diameter of less than 0.5 μm;

(2) an increase rate of the diameters of said fine color particles in a redispersion liquid of a dried ink is less than 50%.

2. A jet ink according to claim 1, wherein an amount of said resin dissolved in said aqueous dispersion is less than 2% by weight of said jet ink.

3. A jet ink according to claim 1, wherein a standard deviation of a frequency distribution of particles diameters of fine color particles in redispersed liquid of dried ink is less than 0.15.

4. A jet ink according to claim 1, wherein the coat forming resin has carboxyl groups and has an acid value of 50 to 180, and all or a part of said carboxyl groups are converted to quaternary ammonium salts by an organic amine compound.

5. A method of producing a jet ink comprising the steps of:

(1) homogeneously mixing (i) a color compound obtained by mixing and kneading a pigment and a coat forming resin having carboxyl groups, (ii) an aqueous medium composed of water and an organic solvent which can dissolve said coat forming resin, and (iii) a base;

(2) manufacturing a dispersion of fine color particles in the aqueous medium, said fine color particles being formed by coating fine pigment particles of said pigment with said coat forming resin having carboxyl groups, and said fine color particles having quaternary carboxyl groups on the surface; and (3) removing said organic solvent from said dispersion.

6. A method according to claim 5, further comprising the steps of depositing on the surface of said fine color particles said coat forming resin dissolved in said aqueous medium of said dispersion of said fine color particles by addition of a poor solvent for said coat forming resin in said dispersion of said fine color particles by addition of a poor solvent for said coat forming resin in said dispersion of said fine color particles, and subsequently removing said organic solvent from said dispersion.

* * * * *